(12) United States Patent
Barton et al.

(10) Patent No.: US 8,380,041 B2
(45) Date of Patent: Feb. 19, 2013

(54) TRANSPORTABLE DIGITAL VIDEO RECORDER SYSTEM

(75) Inventors: James M. Barton, Alviso, CA (US);
Mike Ramsay, Alviso, CA (US)

(73) Assignee: TiVo Inc., Alviso, CA (US)

(*) Notice: Subject to any disclaimer, the term of this patent is extended or adjusted under 35 U.S.C. 154(b) by 1668 days.

(21) Appl. No.: 10/190,256

(22) Filed: Jul. 5, 2002

(65) Prior Publication Data
US 2003/0026589 A1    Feb. 6, 2003

Related U.S. Application Data

(63) Continuation-in-part of application No. 09/827,029, filed on Apr. 5, 2001, now abandoned, which is a continuation of application No. 09/126,071, filed on Jul. 30, 1998, now Pat. No. 6,233,389.

(60) Provisional application No. 60/303,179, filed on Jul. 5, 2001.

(51) Int. Cl.
*H04N 5/775* (2006.01)
(52) U.S. Cl. ........................ 386/230; 386/362
(58) Field of Classification Search .......... 348/714–715; 386/46, 125, 126, 230, 231, 362
See application file for complete search history.

(56) References Cited

U.S. PATENT DOCUMENTS

| | | | |
|---|---|---|---|
| 2,865,990 A | 12/1958 | Towler | |
| 3,682,363 A | 8/1972 | Hull | |
| 3,942,190 A | 3/1976 | Detweiler | |
| 4,141,039 A | 2/1979 | Yamamoto | |
| 4,221,176 A | 9/1980 | Besore et al. | |
| 4,224,481 A | 9/1980 | Russell | |
| 4,233,628 A | 11/1980 | Ciciora | |
| 4,258,418 A | 3/1981 | Heath | |
| 4,306,250 A | 12/1981 | Summers et al. | |
| 4,313,135 A | 1/1982 | Cooper | |
| 4,347,527 A | 8/1982 | Lainez | |
| 4,388,659 A | 6/1983 | Lemke | |
| 4,408,309 A | 10/1983 | Kiesling et al. | |
| 4,423,480 A | 12/1983 | Bauer et al. | |
| 4,439,785 A | 3/1984 | Leonard | |
| 4,506,348 A | 3/1985 | Miller et al. | |
| 4,506,358 A | 3/1985 | Montgomery | |
| 4,566,034 A | 1/1986 | Harger et al. | |
| 4,602,297 A | 7/1986 | Resse | |

(Continued)

FOREIGN PATENT DOCUMENTS

| | | |
|---|---|---|
| CA | 2 137 745 | 12/1994 |
| CN | 1189045 A | 7/1998 |

(Continued)

OTHER PUBLICATIONS

Kozai et al, Machine generated translation of JP 5-181803, Jul. 1993.*

(Continued)

*Primary Examiner* — David Harvey
(74) *Attorney, Agent, or Firm* — Hickman Palermo Truong Becker Bingham Wong LLP; Kirk D. Wong

(57) ABSTRACT

A transportable digital video recorder system provides a transportable DVR containing a processor and persistent storage device storing a plurality of digital streams and is inserted into an authorized receiving device or a docking station. The system allows a receiving device to select a specific digital stream from the persistent storage device which is output to the receiving device and displayed to a user. User control commands are accepted via the receiving device and sent through the system and allow the user to view and listen to stored digital streams with at least the following functions: variable rate fast forward and rewind, frame step, index, pause, variable rate reverse play, variable rate play, and play.

62 Claims, 18 Drawing Sheets

U.S. PATENT DOCUMENTS

| | | | |
|---|---|---|---|
| 4,633,331 A | 12/1986 | McGrady et al. | |
| 4,665,431 A | 5/1987 | Cooper | |
| 4,688,106 A | 8/1987 | Keller et al. | |
| 4,689,022 A | 8/1987 | Peers et al. | |
| 4,706,121 A | 11/1987 | Young | |
| 4,723,181 A | 2/1988 | Hickok | |
| 4,752,834 A | 6/1988 | Koombes | |
| 4,755,889 A | 7/1988 | Schwartz | |
| 4,760,442 A | 7/1988 | Oconnell et al. | |
| 4,761,684 A | 8/1988 | Clark et al. | |
| 4,789,961 A | 12/1988 | Tindall | |
| 4,805,217 A | 2/1989 | Morihiro et al. | |
| 4,816,905 A | 3/1989 | Tweedy et al. | |
| 4,821,121 A | 4/1989 | Beaulier | |
| 4,833,710 A | 5/1989 | Hirashima | |
| 4,876,670 A | 10/1989 | Nakabayashi et al. | |
| 4,891,715 A | 1/1990 | Levy | |
| 4,897,867 A | 1/1990 | Foster et al. | |
| 4,920,533 A | 4/1990 | Dufresne et al. | |
| 4,924,387 A | 5/1990 | Jeppesen et al. | |
| 4,939,594 A | 7/1990 | Moxon et al. | |
| 4,947,244 A | 8/1990 | Fenwick et al. | |
| 4,949,169 A | 8/1990 | Lumelsky et al. | |
| 4,949,187 A | 8/1990 | Cohen | |
| 4,963,866 A | 10/1990 | Duncan | |
| 4,963,995 A | 10/1990 | Lang | |
| 4,972,396 A | 11/1990 | Rafner | |
| 4,979,050 A | 12/1990 | Westland et al. | |
| RE33,535 E | 2/1991 | Cooper | |
| 4,991,033 A | 2/1991 | Takeshita | |
| 5,001,568 A | 3/1991 | Efron et al. | |
| 5,014,125 A | 5/1991 | Pocock et al. | |
| 5,018,186 A | 5/1991 | Kimura et al. | |
| 5,019,900 A | 5/1991 | Clark et al. | |
| 5,021,893 A | 6/1991 | Scheffler | |
| 5,027,241 A | 6/1991 | Hatch et al. | |
| 5,027,400 A | 6/1991 | Baji et al. | |
| 5,047,857 A | 9/1991 | Duffield et al. | |
| 5,057,932 A | 10/1991 | Lang | |
| 5,063,453 A | 11/1991 | Yoshimura et al. | |
| 5,089,885 A | 2/1992 | Clark | |
| 5,093,718 A | 3/1992 | Hoarty et al. | |
| 5,109,281 A | 4/1992 | Koberi et al. | |
| 5,118,105 A | 6/1992 | Brim et al. | |
| 5,121,476 A | 6/1992 | Yee | |
| 5,124,854 A * | 6/1992 | Iyota et al. | 360/96.61 |
| 5,126,852 A | 6/1992 | Nishino et al. | |
| 5,126,982 A | 6/1992 | Yifrach | |
| 5,130,792 A | 7/1992 | Tindell et al. | |
| 5,132,992 A | 7/1992 | Yurt et al. | |
| 5,134,499 A | 7/1992 | Sata et al. | |
| 5,142,532 A | 8/1992 | Adams | |
| 5,153,726 A | 10/1992 | Billing | |
| 5,155,663 A * | 10/1992 | Harase | 361/684 |
| 5,168,353 A | 12/1992 | Walker et al. | |
| 5,172,413 A | 12/1992 | Bradley et al. | |
| 5,202,761 A | 4/1993 | Cooper | |
| 5,208,665 A | 5/1993 | McCalley et al. | |
| 5,214,768 A | 5/1993 | Martin et al. | |
| 5,222,150 A * | 6/1993 | Tajima | 381/105 |
| 5,226,141 A | 7/1993 | Esbensen | |
| 5,227,876 A | 7/1993 | Cucchi et al. | |
| 5,233,423 A | 8/1993 | Jernigan et al. | |
| 5,233,603 A | 8/1993 | Takeuchi | |
| 5,237,648 A | 8/1993 | Mills et al. | |
| 5,241,428 A | 8/1993 | Goldwasser et al. | |
| 5,245,430 A | 9/1993 | Nishimura | |
| 5,247,347 A | 9/1993 | Litteral et al. | |
| 5,251,009 A | 10/1993 | Bruno | |
| 5,253,275 A | 10/1993 | Yurt et al. | |
| 5,283,659 A | 2/1994 | Akiyama et al. | |
| 5,285,272 A | 2/1994 | Bradley et al. | |
| 5,287,182 A | 2/1994 | Haskell | |
| 5,311,423 A | 5/1994 | Clark | |
| 5,317,556 A * | 5/1994 | Tsuboi et al. | 369/112.19 |
| 5,317,603 A | 5/1994 | Osterweil | |
| 5,317,604 A | 5/1994 | Osterweil | |
| 5,329,307 A | 7/1994 | Takemura | |
| 5,329,320 A | 7/1994 | Yifrach | |
| 5,357,276 A | 10/1994 | Banker et al. | |
| 5,361,261 A | 11/1994 | Edem et al. | |
| 5,363,362 A * | 11/1994 | Maeda et al. | 369/47.33 |
| 5,371,551 A | 12/1994 | Logan et al. | |
| 5,388,264 A | 2/1995 | Tobias, II et al. | |
| 5,406,626 A | 4/1995 | Ryan | |
| 5,412,416 A | 5/1995 | Nemirofsky | |
| 5,414,455 A | 5/1995 | Hooper et al. | |
| 5,428,731 A | 6/1995 | Powers | |
| 5,438,423 A | 8/1995 | Lynch et al. | |
| 5,440,334 A | 8/1995 | Walters et al. | |
| 5,442,390 A | 8/1995 | Hooper et al. | |
| 5,452,006 A | 9/1995 | Auld | |
| 5,475,498 A | 12/1995 | Radice | |
| 5,475,656 A * | 12/1995 | Sato et al. | 369/13.37 |
| 5,477,263 A | 12/1995 | O'Callaghan et al. | |
| 5,479,056 A * | 12/1995 | Mabuchi | 307/38 |
| 5,481,542 A | 1/1996 | Logston et al. | |
| 5,486,687 A * | 1/1996 | Le Roux | 235/382 |
| 5,488,409 A | 1/1996 | Yuen et al. | |
| 5,488,433 A * | 1/1996 | Washino et al. | 348/722 |
| 5,497,244 A | 3/1996 | Chargin, Jr. et al. | |
| 5,506,615 A | 4/1996 | Awaji | |
| 5,506,902 A * | 4/1996 | Kubota | 705/51 |
| 5,508,940 A | 4/1996 | Rossmere et al. | |
| 5,510,858 A | 4/1996 | Shido et al. | |
| 5,513,011 A | 4/1996 | Matsumoto et al. | |
| 5,513,306 A | 4/1996 | Mills et al. | |
| 5,519,684 A | 5/1996 | Iizuka et al. | |
| 5,521,630 A | 5/1996 | Chen et al. | |
| 5,528,281 A | 6/1996 | Grady et al. | |
| 5,528,282 A | 6/1996 | Voeten et al. | |
| 5,535,008 A | 7/1996 | Yamagishi et al. | |
| 5,535,137 A | 7/1996 | Rossmere et al. | |
| 5,537,157 A | 7/1996 | Washino et al. | |
| 5,546,250 A * | 8/1996 | Diel | 360/97.02 |
| 5,550,594 A | 8/1996 | Cooper et al. | |
| 5,550,982 A | 8/1996 | Long et al. | |
| 5,555,463 A | 9/1996 | Staron | |
| 5,557,724 A | 9/1996 | Sampat et al. | |
| 5,559,999 A | 9/1996 | Maturi et al. | |
| 5,563,714 A | 10/1996 | Inoue et al. | |
| 5,572,261 A | 11/1996 | Cooper | |
| 5,572,442 A * | 11/1996 | Schulhof et al. | 709/219 |
| 5,574,662 A | 11/1996 | Windrem et al. | |
| 5,577,190 A | 11/1996 | Peters | |
| 5,581,479 A | 12/1996 | McLaughlin et al. | |
| 5,583,561 A | 12/1996 | Baker et al. | |
| 5,583,652 A | 12/1996 | Ware | |
| 5,584,043 A * | 12/1996 | Burkart | 710/62 |
| 5,586,264 A | 12/1996 | Belknap et al. | |
| 5,590,195 A | 12/1996 | Ryan | |
| 5,596,581 A | 1/1997 | Saeijs et al. | |
| 5,598,352 A | 1/1997 | Rosenau et al. | |
| 5,600,364 A | 2/1997 | Hendricks et al. | |
| 5,600,379 A | 2/1997 | Wagner | |
| 5,603,058 A | 2/1997 | Belknap et al. | |
| 5,604,544 A | 2/1997 | Bertram | |
| 5,612,749 A | 3/1997 | Bacher et al. | |
| 5,614,940 A | 3/1997 | Cobbley et al. | |
| 5,615,401 A | 3/1997 | Harscoet et al. | |
| 5,619,247 A | 4/1997 | Russo | |
| 5,619,337 A | 4/1997 | Naimpally | |
| 5,625,464 A | 4/1997 | Compoint et al. | |
| 5,629,732 A | 5/1997 | Moskowitz et al. | |
| 5,635,984 A | 6/1997 | Lee | |
| 5,642,171 A | 6/1997 | Baumgartner | |
| 5,648,824 A | 7/1997 | Dunn et al. | |
| 5,659,539 A | 8/1997 | Porter et al. | |
| 5,659,653 A | 8/1997 | Diehl et al. | |
| 5,664,044 A | 9/1997 | Ware | |
| 5,668,948 A | 9/1997 | Belknap et al. | |
| 5,675,388 A | 10/1997 | Cooper | |
| 5,696,866 A | 12/1997 | Iggulden et al. | |

| | | | |
|---|---|---|---|
| 5,696,868 A | 12/1997 | Kim et al. | |
| 5,701,383 A | 12/1997 | Russo et al. | |
| 5,703,655 A | 12/1997 | Corey et al. | |
| 5,706,388 A | 1/1998 | Isaka | |
| 5,712,976 A | 1/1998 | Falcon, Jr. et al. | |
| 5,715,356 A | 2/1998 | Hirayama et al. | |
| 5,719,982 A | 2/1998 | Kawamura et al. | |
| 5,721,815 A | 2/1998 | Ottesen et al. | |
| 5,721,878 A | 2/1998 | Ottensen et al. | |
| 5,724,474 A | 3/1998 | Oguro et al. | |
| 5,729,741 A | 3/1998 | Liaguno et al. | |
| 5,751,282 A | 5/1998 | Girard et al. | |
| 5,751,338 A | 5/1998 | Ludwig et al. | |
| 5,751,371 A | 5/1998 | Shintani | |
| 5,751,806 A | 5/1998 | Ryan | |
| 5,751,883 A | 5/1998 | Ottensen et al. | |
| 5,754,254 A | 5/1998 | Kobayashi et al. | |
| 5,761,166 A | 6/1998 | Sedlmayr et al. | |
| 5,761,372 A * | 6/1998 | Yoshinobu et al. | 386/83 |
| 5,761,417 A | 6/1998 | Henley et al. | |
| 5,771,334 A | 6/1998 | Yamauchi et al. | |
| 5,774,170 A | 6/1998 | Hite et al. | |
| 5,774,186 A | 6/1998 | Brodsky et al. | |
| 5,778,137 A | 7/1998 | Nielsen et al. | |
| 5,787,225 A | 7/1998 | Honjo | |
| 5,796,695 A * | 8/1998 | Tsutsui | 369/60.01 |
| 5,805,763 A | 9/1998 | Lawler et al. | |
| 5,805,804 A | 9/1998 | Laursen et al. | |
| 5,805,821 A | 9/1998 | Saxena et al. | |
| 5,808,607 A | 9/1998 | Brady et al. | |
| 5,815,671 A | 9/1998 | Morrison | |
| 5,815,689 A | 9/1998 | Shaw et al. | |
| 5,822,493 A | 10/1998 | Uehara et al. | |
| 5,832,085 A | 11/1998 | Inoue et al. | |
| 5,852,705 A | 12/1998 | Hanko et al. | |
| 5,856,930 A * | 1/1999 | Hosono | 715/719 |
| 5,862,342 A | 1/1999 | Winter et al. | |
| 5,864,582 A | 1/1999 | Ander et al. | |
| 5,864,682 A | 1/1999 | Porter et al. | |
| 5,870,553 A | 2/1999 | Shaw et al. | |
| 5,870,710 A * | 2/1999 | Ozawa et al. | 704/500 |
| 5,889,915 A | 3/1999 | Hewton | |
| 5,892,884 A | 4/1999 | Sugiyama et al. | |
| 5,898,695 A | 4/1999 | Fujii et al. | |
| 5,899,578 A | 5/1999 | Yanagihara et al. | |
| 5,909,257 A | 6/1999 | Ohishi et al. | |
| 5,914,941 A * | 6/1999 | Janky | 370/313 |
| 5,920,572 A | 7/1999 | Washington et al. | |
| 5,920,842 A | 7/1999 | Cooper et al. | |
| 5,928,347 A * | 7/1999 | Jones | 710/305 |
| 5,930,444 A | 7/1999 | Camhi et al. | |
| 5,937,138 A | 8/1999 | Fukuda et al. | |
| 5,940,074 A | 8/1999 | Britt, Jr. et al. | |
| 5,949,948 A | 9/1999 | Krause et al. | |
| 5,949,954 A | 9/1999 | Young et al. | |
| 5,956,716 A | 9/1999 | Kenner et al. | |
| 5,963,202 A | 10/1999 | Polish | |
| 5,973,679 A | 10/1999 | Abbott et al. | |
| 5,990,881 A | 11/1999 | Inoue et al. | |
| 5,991,496 A | 11/1999 | Kojitma | |
| 5,995,709 A | 11/1999 | Tsuge | |
| 5,999,691 A | 12/1999 | Takagi et al. | |
| 6,002,832 A | 12/1999 | Yoneda | |
| 6,005,562 A | 12/1999 | Shiga et al. | |
| 6,005,564 A | 12/1999 | Ahmad et al. | |
| 6,018,612 A | 1/2000 | Thomason et al. | |
| 6,028,599 A | 2/2000 | Yuen et al. | |
| 6,028,774 A * | 2/2000 | Shin et al. | 361/764 |
| RE36,801 E | 8/2000 | Logan et al. | |
| 6,112,226 A | 8/2000 | Weaver et al. | |
| 6,137,710 A * | 10/2000 | Iwasaki et al. | 365/52 |
| 6,138,147 A | 10/2000 | Weaver et al. | |
| 6,141,385 A | 10/2000 | Yamaji et al. | |
| 6,151,059 A | 11/2000 | Schein et al. | |
| 6,154,771 A | 11/2000 | Rangan et al. | |
| 6,163,644 A | 12/2000 | Owashi et al. | |
| 6,163,646 A | 12/2000 | Tanaka et al. | |
| 6,167,083 A | 12/2000 | Sporer et al. | |
| 6,169,843 B1 | 1/2001 | Lenihan et al. | |
| 6,172,712 B1 | 1/2001 | Beard | |
| 6,181,706 B1 | 1/2001 | Anderson et al. | |
| 6,192,189 B1 | 2/2001 | Fujinami et al. | |
| 6,198,877 B1 | 3/2001 | Kawamura et al. | |
| 6,209,041 B1 | 3/2001 | Shaw et al. | |
| 6,226,447 B1 | 5/2001 | Sasaki et al. | |
| 6,229,532 B1 | 5/2001 | Fujii | |
| 6,233,389 B1 | 5/2001 | Barton et al. | |
| 6,243,741 B1 | 6/2001 | Utsumi | |
| 6,249,641 B1 | 6/2001 | Yokota | |
| 6,253,375 B1 | 6/2001 | Gordon et al. | |
| 6,256,704 B1 | 7/2001 | Hlava et al. | |
| 6,263,396 B1 | 7/2001 | Cottle et al. | |
| 6,272,672 B1 | 8/2001 | Conway | |
| 6,278,837 B1 | 8/2001 | Yasukohchi et al. | |
| 6,282,209 B1 | 8/2001 | Kataoka et al. | |
| 6,285,824 B1 | 9/2001 | Yanagihara et al. | |
| 6,292,618 B1 | 9/2001 | Ohara et al. | |
| 6,292,619 B1 | 9/2001 | Fujita et al. | |
| 6,298,016 B1 * | 10/2001 | Otsuka | 369/14 |
| 6,301,711 B1 | 10/2001 | Nusbickel | |
| 6,304,714 B1 | 10/2001 | Krause et al. | |
| 6,317,885 B1 | 11/2001 | Fries | |
| 6,327,418 B1 | 12/2001 | Barton | |
| 6,330,334 B1 | 12/2001 | Ryan | |
| 6,330,675 B1 | 12/2001 | Wiser et al. | |
| 6,332,175 B1 * | 12/2001 | Birrell et al. | 711/112 |
| 6,341,195 B1 | 1/2002 | Mankovitz et al. | |
| 6,353,461 B1 | 3/2002 | Shore et al. | |
| 6,356,708 B1 | 3/2002 | Krause et al. | |
| 6,359,636 B1 | 3/2002 | Schindler et al. | |
| 6,360,320 B1 * | 3/2002 | Ishiguro et al. | 713/164 |
| 6,363,212 B1 | 3/2002 | Fujinami et al. | |
| 6,400,407 B1 | 6/2002 | Zigmond et al. | |
| 6,424,791 B1 | 7/2002 | Saib | |
| 6,445,738 B1 | 9/2002 | Zdepski et al. | |
| 6,445,872 B1 | 9/2002 | Sano et al. | |
| 6,480,353 B1 * | 11/2002 | Sacks et al. | 360/97.02 |
| 6,480,667 B1 | 11/2002 | O'Connor | |
| 6,490,000 B1 | 12/2002 | Schaefer et al. | |
| 6,496,647 B2 * | 12/2002 | Arai et al. | 386/95 |
| 6,498,894 B2 | 12/2002 | Ito et al. | |
| 6,504,990 B1 | 1/2003 | Abecassis | |
| 6,516,467 B1 | 2/2003 | Schindler | |
| 6,529,685 B2 | 3/2003 | Ottesen et al. | |
| 6,535,465 B1 * | 3/2003 | Shigetomi et al. | 369/14 |
| 6,542,695 B1 | 4/2003 | Akiba et al. | |
| 6,553,178 B2 | 4/2003 | Abecassis | |
| 6,567,127 B1 * | 5/2003 | Orr et al. | 348/478 |
| 6,694,200 B1 * | 2/2004 | Naim | 700/94 |
| 6,697,944 B1 * | 2/2004 | Jones et al. | 713/168 |
| 6,698,020 B1 | 2/2004 | Zigmond et al. | |
| 6,704,493 B1 * | 3/2004 | Matthews et al. | 386/98 |
| 6,708,251 B1 * | 3/2004 | Boyle et al. | 711/112 |
| 6,748,539 B1 * | 6/2004 | Lotspiech | 726/20 |
| 6,754,254 B2 | 6/2004 | Sendonaris | |
| 6,757,165 B2 * | 6/2004 | Fujiki et al. | 361/679.41 |
| 6,766,956 B1 * | 7/2004 | Boylan et al. | 235/462.45 |
| 6,788,882 B1 | 9/2004 | Geer et al. | |
| 6,829,254 B1 | 12/2004 | Rajahalme et al. | |
| 6,865,431 B1 * | 3/2005 | Hirota et al. | 700/94 |
| 6,925,246 B1 | 8/2005 | Behl | 386/46 |
| 6,950,941 B1 * | 9/2005 | Lee et al. | 713/193 |
| 6,959,221 B1 * | 10/2005 | Kataoka | 700/94 |
| 6,959,384 B1 * | 10/2005 | Serret-Avila | 713/176 |
| 6,985,584 B1 * | 1/2006 | Yokota et al. | 380/200 |
| 6,993,567 B1 * | 1/2006 | Yodo et al. | 709/217 |
| 7,032,177 B2 | 4/2006 | Novak et al. | |
| 7,050,705 B1 * | 5/2006 | Mori | 386/125 |
| 7,055,166 B1 | 5/2006 | Logan et al. | |
| 7,137,011 B1 * | 11/2006 | Harari et al. | 713/189 |
| 7,239,800 B2 * | 7/2007 | Bilbrey | 386/248 |
| 7,266,704 B2 * | 9/2007 | Levy | 713/193 |
| 7,272,298 B1 | 9/2007 | Lang et al. | |
| 7,346,582 B2 * | 3/2008 | Sako et al. | 705/51 |
| 7,607,157 B1 * | 10/2009 | Inoue et al. | 725/102 |
| 8,078,032 B1 | 12/2011 | Hatanaka et al. | 386/248 |
| 2001/0013120 A1 * | 8/2001 | Tsukamoto | 725/5 |
| 2002/0003949 A1 * | 1/2002 | Mamiya et al. | 386/125 |

| | | | |
|---|---|---|---|
| 2002/0012531 A1* | 1/2002 | Flannery | 386/126 |
| 2002/0017558 A1* | 2/2002 | Graves | 235/380 |
| 2002/0028063 A1* | 3/2002 | Haneda et al. | 386/83 |
| 2002/0056118 A1* | 5/2002 | Hunter et al. | 725/87 |
| 2002/0144265 A1* | 10/2002 | Connelly | 725/39 |
| 2002/0164156 A1* | 11/2002 | Bilbrey | 386/112 |
| 2002/0176690 A1 | 11/2002 | Nagasawa | |
| 2002/0199043 A1* | 12/2002 | Yin | 710/62 |
| 2003/0040962 A1* | 2/2003 | Lewis | 705/14 |
| 2003/0118014 A1 | 6/2003 | Iyer et al. | |
| 2003/0215211 A1 | 11/2003 | Coffin, III | |
| 2004/0117483 A1 | 6/2004 | Singer et al. | |
| 2004/0193900 A1* | 9/2004 | Nair | 713/193 |
| 2005/0025469 A1 | 2/2005 | Geer et al. | |
| 2005/0122335 A1 | 6/2005 | MacInnis et al. | |
| 2005/0132418 A1 | 6/2005 | Barton et al. | |
| 2005/0226604 A1 | 10/2005 | Kawamura et al. | |
| 2006/0045470 A1 | 3/2006 | Poslinski et al. | |
| 2007/0166001 A1 | 7/2007 | Barton | |
| 2007/0230921 A1 | 10/2007 | Barton et al. | |
| 2008/0288998 A1 | 11/2008 | Locket | |
| 2009/0136215 A1 | 5/2009 | Barton et al. | |
| 2009/0208185 A1 | 8/2009 | Barton et al. | |
| 2009/0269024 A1 | 10/2009 | Lockett | |

FOREIGN PATENT DOCUMENTS

| | | |
|---|---|---|
| DE | 3909334 A1 | 9/1990 |
| DE | 4201 031 C2 | 7/1993 |
| DE | 44 34 034 A1 | 3/1996 |
| EP | 0594241 A1 | 10/1993 |
| EP | 0594241 B1 | 4/1994 |
| EP | 0 651 328 A1 | 5/1995 |
| EP | 0701371 A1 | 3/1996 |
| EP | 0726574 A2 | 8/1996 |
| EP | 0726574 A2 | 8/1996 |
| EP | 0766476 A2 | 9/1996 |
| EP | 0762756 A2 | 3/1997 |
| EP | 784400 * | 7/1997 |
| EP | 0785675 A2 | 7/1997 |
| EP | 0817483 A2 | 1/1998 |
| EP | 0817483 A2 | 1/1998 |
| GB | 2222742 A | 8/1989 |
| GB | 2 286 282 A | 8/1995 |
| GB | 2320637 | 6/1998 |
| GB | 2333017 | 7/1999 |
| JP | 61-133089 * | 6/1986 |
| JP | 02-266774 * | 10/1990 |
| JP | 3-34685 * | 2/1991 |
| JP | 03-34685 * | 2/1991 |
| JP | 04088772 | 3/1992 |
| JP | 5-181803 * | 7/1993 |
| JP | 06233234 | 8/1994 |
| JP | 06245157 | 9/1994 |
| JP | H6-245182 | 9/1994 |
| JP | 07264529 | 1/1995 |
| JP | H7-30839 | 1/1995 |
| JP | 7-44907 A | 2/1995 |
| JP | H7-44907 | 2/1995 |
| JP | 07111629 | 4/1995 |
| JP | 07131754 | 5/1995 |
| JP | 07250305 | 9/1995 |
| JP | 8-279273 A | 10/1996 |
| JP | H8-289240 | 11/1996 |
| JP | 09233415 | 5/1997 |
| JP | 10-56620 A | 2/1998 |
| JP | 11-203135 A | 7/1999 |
| JP | 2000-295560 A | 10/2000 |
| WO | WO 91/03112 A1 | 8/1990 |
| WO | 92/04573 | 6/1992 |
| WO | WO 92/22983 A2 | 12/1992 |
| WO | WO 93/16557 A1 | 8/1993 |
| WO | WO 94/17626 | 8/1994 |
| WO | WO 95/33336 | 12/1995 |
| WO | WO 98/48566 | 10/1998 |
| WO | WO 98/56188 A2 | 12/1998 |
| WO | WO 00/76130 A1 | 5/2000 |
| WO | WO 00/33568 A1 | 6/2000 |
| WO | WO 01/53963 | 7/2001 |
| WO | WO 03/019932 | 3/2003 |

OTHER PUBLICATIONS

*Sitrick* v. *Dreamworks LLC*. (CAFC) 85 USPQ2d 1826.*

United States Patent and Trademark Office, "Ex Parte Reexamination Communication Transmittal Form", Reexamination Control No. 90/007,750, dated Nov. 28, 2007, 20 pages.

European Patent Office, "Communication pursuant to Article 94(3) EPC", Foreign application No. 02 796 373.5-1522, received Jan. 25, 2008, 6 pages.

Claims, Foreign application No. 02 796 373.5-1522, 5 pages.

European Patent Office, Notice of Opposition, European Application No. EP 1 729 515, Interressensgemeinschaft fur Rundfunkschutzrechte e.V., opponent, dated Jan. 23, 2009.

U.S. District Court for the Eastern District of Texas, Marshall Division, *Tivo's and Verizon Communications Inc., Verizon Service Corp. and Verizon Corporation Resources Group LLC Invalidity Contentions, TiVo Inc.* vs. *Verizon Communications Inc*. Case No. 2:09-CV-257-DF, 44 pages.

Chinese Office Action received in Application No. 200580041645.9 dated Nov. 24, 2011 (9 pages).

Current Claims of Chinese Application No. 200580041645.9 dated Nov. 2011 (11 pages).

Office Action received in European application No. 11182065.0 dated Dec. 16, 2011 (9 pages).

Current Claims of European application No. 11182065.0 dated Dec. 2011 (3 pages).

Inside MacIntosh "QuickTime", Apple Technology Library by Apple Computer, Inc., © 1993 (published by Addison-Wesley Publishing Company) 719 pgs.

Inside MacIntosh "Files", Apple Technology Library by Apple Computer, Inc., © 1992 (published by Addison-Wesley Publishing Company) 532 pgs.

Inside MacIntosh "Memory", Apple Technology Library by Apple Computer, Inc., © 1992 (published by Addison-Wesley Publishing Company) 303 pgs.

Inside MacIntosh "QuickTime Components", Apple Technology Library by Apple Computer, Inc., © 1993 (published by Addison-Wesley Publishing Company) 828 pgs.

Inside MacIntosh "Overview", Apple Technology Library by Apple Computer, Inc., © 1992 (published by Addison-Wesley Publishing Company) 251 pgs.

Quantum Q500 Series High Capacity 5 ¼" Fixed Disk Drive, Quantum Corporation, © 1983 (2 pgs).

Quantum 2000 Series Low-Cost 8' Fixed Disk Drives, "New DC Motor Option", Quantum Corporation (2 pgs).

Quantum Q2080 Low-Cost, 85 Megabyte Fixed Disk Drive, "85 Mb capacity/40ms average access time", Quantum Corporation, © 1982 (2 pgs).

OEM Interface Specifications for DSAA-3xxx, 3.5-Inch Hard Disk Drive with ATA Interface, IBM Corporation, © 1994 (65 pgs).

International Standard ISO/IEC 11172-2:1993(E), (Part 2: Video), Downloaded Jun. 15, 2005 (136 pgs).

International Standard ISO/IEC 11171-3:1993/Cor.1:1996(E), (Part 3: Audio), Downloaded Jun. 15, 2005 (159 pgs).

Hewlett Packard® MPEGscope User's Guide, Hewlett Packard Company © 2000 (282 pgs).

DiviCom, MP100 User Guide, DiviCom, Inc., © 1996 (97 pgs).

Hewlett Packard® MPEGscope Startup Guide, Hewlett Packard Company © 2000 (39 pgs).

MediaStream by Media4, "Desktop Satellite Multimedia", "The MediaStream Receiver Card", "MediaStream Uplink System", by Media4, Inc. (2 pgs).

Jim Stratigos et al., Media4 Press Release "Announces Reseller Agreement with AlphaStar Television Networks", Microsoft® and Windows® 95 (3 pgs).

Jim Stratigos et al., Media4 Press Release "Announces Multimedia Satellite Network for Personal Computers", Microsoft® and Windows® 95 (3 pgs).

Media Stream, "Satellite Receiver" Installation and Users Guide for Windows 95, Media4, Inc., © 1996 (33 pgs).

International Standard ISO/IEC 13818-1:2000(E) "Information Technology—Generic Coding of Moving Pictures and Associated Audio Information: Systems", © ISO/IEC 2000, Downloaded Jun. 30, 2005 (173 pgs).
International Standard ISO/IEC 13818-1:2000/Amd.2:2004(E) "Information Technology—Generic Coding of Moving Pictures and Associated Audio Information: Systems", Amendment 2: Support of IPMP on MPEG-2 Systems, © ISO/IEC 2004, Downloaded Jun. 30, 2005 (13 pgs), 2000.
International Standard ISO/IEC 13818-2:2000(E) "Information Technology—Generic Coding of Moving Pictures and Associated Audio Information: Video", © ISO/IEC 2000, Downloaded Jun. 30, 2005 (219 pgs).
International Standard ISO/IEC 13818-3:1998(E) "Information Technology—Generic Coding of Moving Pictures and Associated Audio Information: Audio", © ISO/IEC 1998 (125 pgs).
Guide to VAX/VMS File Applications,, Software Version VAX/VMS Version 4.0, Sep. 1984 (19 pgs).
Harrick M. Vin, et al., *Designing A Multiuser HDTV Storage Server*, IEEE Journal, vol. 11, No. 1, Jan. 1993 (pp. 153-164).
Quantum Fireball 640/1280S Product Manual, Quantum®, Copyright © 1995 by Quantum Corporation (190 pgs).
Winston Hodge, et al., "*Chapter 7, True Video on Demand vs. Near Video on Demand*", delivered at National Cable Television Conference, May 24, 1994 (pp. 103-120).
Cyril U. Orji, et al., "*Design and Configuration Rationales for Digital Video Storage and Delivery Systems*", Multimedia Tools and Applications, 9, 275-302 (1992), © 1992 Kluwer Academic Publishers, Boston (pp. 275-302).
SCSI Specification, 0663 and 0663 Enhanced Disk Drive, Release 4.0, (247 pgs).
Johnston, et al., "*A Digital Television Sequence Store*", IEEE, (pp. 594-600) © 1978.
M. Hausdorfer, "*Symposium Record Broadcast Sessions*", HDTV Production: Today and Tomorrow, Jun. 17, 1989, (7 pgs).
S. Berson, "*Computer Science Department Technical Report*", Staggered Striping in Multimedia Information System, Dec. 1993, Apr. 29, 1994, (24 pgs).
S. Berson, et al., "*Design of a Scalable Multimedia Storage Manager*", (pp. 1-30).
Conner Filepro Performance Series, CFP1060E/CFP1060S/CFP1060W, "*Intelligent Disk Drive Product Manual*", Rev. A, May 1994, © 1994, Conner Peripherals, Inc., (79 pgs).
Hugh M. Sierra, "*An Introduction to Direct Access Storage Devices*", © 1990 by Academic Press, Inc., (269 pgs).
I. Freedman, et al., "*Systems Aspects of COBE Science Data Compression*", Cosmology Data Analysis Center, (pp. 85-97).
Douglas T. Anderson, "*The Hard Disk Technical Guide*", Tenth Revision S-D., Feb. 1994, by Micro House International Inc., (70 pgs).
International Standard ISO/IEC 11172 (MPEG-1 Standard, Part 1: Systems).
K. Shen et al., *A Fast Algorithm for Video Parsing Using MPEG Compressed Sequences*, IEEE, pp. 252-255 (0-8185-7310-9/626/1995), 1995.
S. Smollar et al., *Content-based Video Indexing and Retrieval*, IEEE, Summer 1994, pp. 62-72.
J. Meng et al., *CVEPS—A Compressed Video Editing and Parsing System*, ACM Multimedia '96, Boston MA, pp. 43-53 (ACM 0-89791-671-1/96/1), 1996.
Zhang, HongJiang, "Video Parsing, Retrieval and Browsing: An Integrated and Content-Based Solution," ACM Multimedia 95, Electronic Proceedings, Nov. 5-9, 1995, 16 pages.
Official Action from EPO for foreign patent application No. 99 909 867.06-2202 dated Dec. 27, 2005 (5 pgs)—attached.
Current Claims in EPO patent application No. 99 909 867.06-2002 (9 pgs)—attached.
Office Action from CN for foreign patent application No. 200410056388.3 dated Nov. 25, 2005 (15 pgs)—attached.
Current Claims in CN patent application No. 200410056388.3 (9 pgs)—attached.
U.S. District Court for the Eastern District of Texas, Marshall Division, *Tivo's and Verizon Communications Inc., Verizon Service Corp. and Verizon Corporation Resources Group LLC Invalidity Contentions, TiVo Inc.* vs. *Verizon Communications Inc.* Case No. 2:09-CV-257-DF 44 pages.
Exhibit A1 to AT&T's and Microsoft Corporation's Invalidity Contentions: Claim Chart of U.S. Patent No. 6,233,389 in view of U.S. Patent No. 5,557,724 to Sampat, 23 pages.
Exhibit A2 to AT&T's and Microsoft Corporation's Invalidity Contentions: Claim Chart of U.S. Patent No. 6,233,389 in view of U.S. Patent No. 6,169,843, 6 pages.
Exhibit A3 to AT&T's and Microsoft Corporation's Invalidity Contentions: Claim Chart of U.S. Patent No. 6,233,389 in view of U.S. Patent No. 6,181,706, 5 pages.
Exhibit A4 to AT&T's and Microsoft Corporation's Invalidity Contentions: Claim Chart of U.S. Patent No. 6,233,389 in view of U.S. Patent No. 7,272,298 to Lang, 11 pages.
Exhibit A5 to AT&T's and Microsoft Corporation's Invalidity Contentions: Claim Chart of U.S. Patent No. 6,233,389 in view of U.S. Patent No. 6,209,041, 140 pages.
Exhibit A6 to AT&T's and Microsoft Corporation's Invalidity Contentions: Claim Chart of U.S. Patent No. 6,233,389 in view of U.S. Patent No. 6,172,712, 137 pages.
Exhibit A7 to AT&T's and Microsoft Corporation's Invalidity Contentions: Claim Chart of U.S. Patent No. 6,233,389 in view of Graham Thomason, EP0594241, 136 pages.
Exhibit A8 to AT&T's and Microsoft Corporation's Invalidity Contentions: Claim Chart of U.S. Patent No. 6,233,389 in view of U.S. Patent No. 5,822,493, 161 pages.
Exhibit A9 to AT&T's and Microsoft Corporation's Invalidity Contentions: Claim Chart of U.S. Patent No. 6,233,389 in view of U.S. Patent No. 6,490,000, 134 pages.
Exhibit A10 to AT&T's and Microsoft Corporation's Invalidity Contentions: Claim Chart of U.S. Patent No. 6,233,389 in view of C. Hanna et al., Demultiplexer IC for MPEG2 Transport Streams, 138 pages.
Exhibit A11 to AT&T's and Microsoft Corporation's Invalidity Contentions: Claim Chart of U.S. Patent No. 6,233,389 in view of Robert Johnson, A Digital Television Sequence Store, 148 pages.
Exhibit A12 to AT&T's and Microsoft Corporation's Invalidity Contentions: Claim Chart of U.S. Patent No. 6,233,389 in view of U.S. Patent No. 5,721,815 to Ottesen, 18 pages.
Exhibit A13 to AT&T's and Microsoft Corporation's Invalidity Contentions: Claim Chart of U.S. Patent No. 6,233,389 in view of U.S. Patent No. 6,018,612 to Thomason, et al. and further in view of U.S. Patent No. 5,949,948 to Krause et al., 7 pages.
Exhibit A14 to AT&T's and Microsoft Corporation's Invalidity Contentions: Claim Chart of U.S. Patent No. 6,233,389 in view of U.S. Patent No. 6,018612, and further in view of U.S. Patent No. 5,477,263 and U.S. Patent No. 6,169,843, 11 pages.
Exhibit A15 to AT&T's and Microsoft Corporation's Invalidity Contentions: Claim Chart of U.S. Patent No. 6,233,389 in view of "StreamObjects: Dynamically-Segmented Scalable Media Over the Internet" by Steven Niemczyk, 17 pages.
Exhibit A16 to AT&T's and Microsoft Corporation's Invalidity Contentions: Claim Chart of U.S. Patent No. 6,233,389 in view of "A Programming System for the Dynamic Manipulation of Temporally Sensitive Data" by Christopher J. Lindblad, 16 pages.
Exhibit A17 to AT&T's and Microsoft Corporation's Invalidity Contentions: Claim Chart of U.S. Patent No. 6,233,389 in view of "An Architecture for Networked Multimedia" by Jonathan C. Soo, 12 pages.
Exhibit A18 to AT&T's and Microsoft Corporation's Invalidity Contentions: Claim Chart of U.S. Patent No. 6,233,389 in view of "Design of a Storage and Retrieval Model for Multimedia Data" by Ruihong Wang, 11 pages.
Exhibit A19 to AT&T's and Microsoft Corporation's Invalidity Contentions: Claim Chart of U.S. Patent No. 6,233,389 in view of U.S. Patent No. 6,304,714 to Krause et al., 7 pages.
Exhibit A20 to AT&T's and Microsoft Corporation's Invalidity Contentions: Claim Chart of U.S. Patent No. 6,233,389 in view of U.S. Patent No. 5,990,881, 6 pages.
Exhibit A21 to AT&T's and Microsoft Corporation's Invalidity Contentions: Claim Chart of U.S. Patent No. 6,233,389 in view of U.S. Patent No. 5,898,695, 6 pages.

Exhibit A22 to AT&T's and Microsoft Corporation's Invalidity Contentions: Claim Chart of U.S. Patent No. 6,233,389 in view of "Developing Object-Oriented Multimedia Software" by Phillip Ackermann, 9 pages.
Exhibit A23 to AT&T's and Microsoft Corporation's Invalidity Contentions: Claim Chart of U.S. Patent No. 6,233,389 in view of U.S. DISHplayer 7100 System and U.S. Patent No. 6,490,000, 21 pages.
U.S. District Court for the Eastern District of Texas, Marshall Division, *AT&T's and Microsoft Corporation's Invalidity Contentions, TiVo Inc. vs. AT&T Inc. and Microsoft Corporation*, Case No. 2:09-CV-259-DF, 44 pages, May 21, 2010.
Ash, Robert "Real-Time Encoding and Feeds in Oracle Video Server" an Oracle white paper, Mar. 1998, 7 pages.
Dowden, John et al. "Oracle Video Server: Getting Started with Oracle Video Server Manager" release 3.0, Feb. 1998, part No. A55979-02, 48 pages.
Hanna, C. et al. "Demultiplexer IC for MPEG2 Transport Streams" IEEE Transactions on Consumer Electronics, vol. 41, No. 3, Aug. 1995, pp. 699-706.
Kurioka, Tatsuya et al. "Television Homer Server for Integrated Services—Toward the Realization of ISDB 'Anytime' Services-" NHK Science and Technical Research Laboratories, Tokyo, Japan, Proceedings ISCE '97, IEEE International Symposium on consumer Electronics, pp. 250-253, 1997.
Lindblad, Christopher "A Programming System for the Dynamic Manipulation of Temporally Sensitive Data" MIT Laboratory for Computer Science, Aug. 1994, 275 pages.
Linden, Brian et al. "Oracle Video Server™: Introducing Oracle Video Server" release 3.0, Feb. 1998, part No. A53956-02, 78 pages.
McKendrick, Martin "Adding Video to Applications with the Oracle Video Server" an Oracle White Paper, Mar. 1998, 30 pages.
Minneman, Scott L. et al. "Where Were We: making and using near-synchronous, pre-narrative video" International Multimedia Conference, Proceedings of the first ACM International Conference on Multimedia 1993, pp. 207-214, (9 pages).
Niemczyk, Steven "StreamObjects: Dynamically-Segmented Scalable Media Over the Internet" submitted to the Department of Electrical Engineering and Computer Science, Massachusetts Institute of Technology, May 27, 1996, 90 pages.
Oracle Corporation "Video-Enhanced Web Services: Delivering Interactive Television and Switched Video Broadcast Services" an Oracle, Digital, Ericsson and Acorn White Paper, Mar. 1998, 11 pages.
Soo, Jonathan C. "An Architecture for Networked Multimedia" submitted to the Department of Electrical Engineering and Computer Science, Massachusetts Institute of Technology, May 30, 1995, 49 pages.
Tektronix PDR 100 Profile™ Video Disk Recorder 070-9042-02, User Manual, First printing: Feb. 1995, Revised: Aug. 1995, 156 pages.
Wang, Ruihong "Design of a Storage and Retrieval Model for Multimedia Data" Thesis, submitted to the School of Graduate Studies and Research, Ottawa-Carleton Institute of Electrical Engineering, 1994, 116 pages.
Oracle Corporation "Oracle Video Server™: Installation Guide" Release 3.0 for Sun SPARC Solaris 2.x, Feb. 1998, part No. A59554-01, 82 pages.
Dowden, John et al. Oracle Video Server™: Quick Start, Release 3.0, Feb. 1998, part No. A53954-02, 28 pages.
Oracle Corporation "Oracle Video Server™: Release Notes" Realease 3.0.4 for Sun SPARC Solaris 2.x. May 1998, part No. A53951-03, 34 pages.
Rosen, Daryl "Oracle Video Server System Technical Overview" An Oracle White Paper, Mar. 1998, 15 pages.
Engst, Adam "Quick Time" article originally appeared in TidBITS on Jul. 22, 1991 at 12:00 p.m., the permanent URL for the article is: http://db.tidbits.com/article/3441, 5 pages.
Brophy, Karen A. "SuperMac's JPEG-based DigitalFilm card could change the multimedia game" article from INFOWORLD, Aug. 9, 1993, p. 68.
Pugh, Jon "VideoSpigot Review" article originally appeared in TidBITS on Apr. 20, 1992 at 12:00 p.m., the permanent URL for the article is: http://db.tidbits.com/article/3120, 3 pages.

Computergram "WebTV Networks Promises TV-Quality Video with VideoFlash", Jan. 20, 1997, article from www.cbronline.com, 1 page.
Coale, Kristi "WebTV Plus Raises the Stakes" Sep. 16, 1997, article URL is http://www.wired.com/print/science/discoveries/news/1997/09/6914, 2 pages.
Phillip Ackermann, excerpts including: the cover, pp. 66-69 and pp. 190-193 from the book entitled "Developing Object-Oriented Multimedia Software" copyright 1996 by dpunkt, 5 pages.
Loronix CCTVware Enterprise Product Brochure, 2 pages.
Loronix CCTVware Solo Product Brochure, 2 pages.
Ex Parte Reexamination Certificate, U.S. Patent No. 6,233,389, C1, issued Nov. 11, 2008.
Order Granting Request for Ex Parte Reexamination, U.S. Patent No. 6,233,389, Control No. 90/009,329, mailed Jan. 7, 2009.
Peuker, Thomas, "An Object-Oriented Architecture for the Real-Time Transmission of Multimedia Data Streams", Institute für Mathematische Maschinen and Datenverarbeitung (Informatik) IV, Lehrstul für Betriebssyteme Universität Erlangen-Nürnberg, Erlangen, Mar. 17, 1997.
Mayer-Patel, Ketan et al., "Synchronized Continuous Media Playback Through the World Wide Web", U.C. Berkeley, Computer Science Division, Berkeley Multimedia Research Center, Published:1996, Berkeley, CA.
Chatterjee, Amit et al., "Microsoft DirectShow: A New Media Architecture", SMPTE Journal, pp. 865-871, Dec. 1997.
Fung, Chi-Leung et al., "MOCS: an Object-Oriented Programming Model for Multimedia Object Communication and Synchronization", Department of Computer Science, The Hong Kong University of Science and Technology, Clear Water Bay, Kowloon, Hong Kong, 1994 IEEE.
Gibbs, Simon, "Composite Multimedia and Active Objects", Centre Universitaire d"Informatique, Université de Genève, Proc., appeared in OOPSLA '91, 1991.
European Patent Office, Communication dated Feb. 5, 2009, in European Patent No. 1729515, Notice of Opposition, Brunner/Williamson opponents.
Australian Government, "Patent Examination Report No. 1", received in Australian application No. 20100202449, dated Jun. 28, 2012, 3 pages.
Current Claims in Australian application No. 20100202449, as of Jun. 28, 2012, 3 pages.
Astarte DVDirector Beta Testing Program.
Ramanathan et al., "Toward personalized multimedia dial-up services," Computer Networks and ISDN Systems Jul. 26, 1994, No. 10, Amsterdam NL.
Fuji et al., "Implementation of MPEG Transport Demultiplexer with a RISC-Based Microcontroller", IEEE, 1996.
Macweek News article entitled "Quick Time Ready for Prime Time", dated Dec. 10, 1991 (2 pages).
Hewlett Packard Laboratories Technical Report entitled "UNIX Disk Access Patterns", by Chris Ruemmler and John Wildes, HPL-92-152, dated Dec. 1992 (pp. 405-420), Hewlett-Packard Company, 1992.
J.M.Harker Et Al., "A Quarter Century of Disk File Innovation," IBM J. Res. Develop., vol. 25, No. 5, Sep. 1981, pp. 677-690.
A.D. Hospodor, "The Effect of Prefetch in SCSA Disk Drive Cache Buffers," Doctoral Thesis, Santa Clara University, May 2, 1994.
D.J. Woodham, "HDTV Production: Today and Tomorrow: A Solid State "Action Relay" Recorder", Symposium Record Broadcast Sessions, System Session P-2, dated Jun. 17, 1989 (8 pgs.).
U.S. District Court for the Eastern District of Texas, Marshall Division, Complaint for Patent Infringement and Jury Demand, *Tivo Inc.* v. *AT&T Inc.*, Case No. 2:09-cv-259, Aug. 26, 2009.
U.S. District Court for the Eastern District of Texas, Marshall Division, Complaint for Patent Infringement and Jury Demand, *Tivo Inc.* v. *Verizon Communications, Inc.*, Case No. 2:09-cv-257, Aug. 26, 2009.
Japanese Application 2003524253, Office Action dated Aug. 19, 2005.
European Application No. 06019602.9, Office Action dated Jan. 10, 2007.
European Application No. 06019602.9, Search Report dated Nov. 6, 2006.

U.S. District Court for the Eastern District of Texas, Marshall Division, Amended Final Judgment and Permanent Injunction, *Tivo Inc. v. Echostar Communications Corp. et al.*, Case No. 2:04-CV-1-DF, Jun. 2, 2009.

U.S. District Court for the Eastern District of Texas, Marshall Division, Memorandum Opinion, *Tivo Inc. v. Echostar Communications Corp. et al.*, Case No. 2:04-CV-1-DF, Jun. 2, 2009.

Petition of Patent Owner to Vacate Order Granting Second Reexamination Request, U.S. Patent No. 6,233,389, Control No. 90/009,329, filed May 27, 2009.

Petition of Patent Owner to Temporarily Suspend *Ex Parte* Reexamination Proceeding, U.S. Patent No. 6,233,389, Control No. 90/009,329, filed May 27, 2009.

Chinese Application No. 200410056388.3, Office Action dated Nov. 25, 2005.

"New Graphics Enhancements Will Be on Display at NAB (National Association of Broadcasters Exhibition", Broadcasting v118, n11, p. 57, Mar. 12, 1990.

"Next Video Recorder—Tape or Disc?", Consumer Electronics, v33, n8, Feb. 22, 1993.

McLarnon, Zed et al., "Digital Image Meets Digital Audio; Sync Problems Faced by Multimedia Producer Now", Advanced Imaging, v9, nl, p. 62, Jan. 1994.

Nelson, Lee J. "The Latest in Compression Hardware & Software (Product Survey)", Advanced Imaging, v9, nl, p. 56, Jan. 1995.

Leek, Matthew R., et al., "MPEG Q&A (Moving Pictures Expert Group Digital Video Compression Standard")", CD-ROM Professional, v7, n4, p. 41, Jul.-Aug. 1994.

Ceccarelli, M et al., "A sequence analysis system for video databases," Time-Varying Image Processing and Moving Object Recognition 4, Elsevier Science B.V., pp. 133-138, 1997.

Hanjalic et al., "Automation of systems enabling search on stored video data," SPIE/IS&T Electronic Imaging '97, vol. 3022, pp. 427-438, Jan. 15, 1997.

DMA, published in Embedded Systems Programming, 4 pages, Oct. 1994.

European Patent Office, Application No. 07025136.8-1522, Office Action dated Mar. 30, 2009.

European Patent Office, Application No. 07025136.8-1522, current claims as of Mar. 30, 2009.

Decision on Petition of Patent Owner to Temporarily Suspend Ex Parte Reexamination Proceeding, U.S. Patent No. 6,233,389, Control No. 90/009,329, mailed Sep. 14, 2009.

Non-final Office Action in Reexamination Proceeding, U.S. Patent No. 6,233,389, Control No. 90/009,329, mailed Aug. 3, 2009.

Decision on Petition of Patent Owner to Temporarily Suspend Ex Parte Reexamination Proceeding, U.S. Patent No. 6,233,389, Control No. 90/009,329, mailed Aug. 21, 2009.

* cited by examiner

TRANSPORTABLE DIGITAL VIDEO RECORDER SYSTEM

CROSS REFERENCE TO RELATED APPLICATIONS

This application is a Continuation-in-part of U.S. patent application Ser. No. 09/827,029, filed on 5 Apr. 2001 now abandoned, which is a continuation of U.S. patent application Ser. No. 09/126,071, filed on 30 Jul. 1998, now U.S. Pat. No. 6,233,389. This application further claims benefit of U.S. Provisional Patent Application Ser. No. 60/303,179, filed on 5 Jul. 2001.

BACKGROUND OF THE INVENTION

1. Technical Field

The invention relates to the time shifting of television broadcast signals. More particularly, the invention relates to the real time capture, storage, and display of television broadcast signals.

2. Description of the Prior Art

The Video Cassette Recorder (VCR) has changed the lives of television (TV) viewers throughout the world. The VCR has offered viewers the flexibility to time shift TV programs to match their lifestyles.

The viewer stores TV programs onto magnetic tape using the VCR. The VCR gives the viewer the ability to play, rewind, fast forward and pause the stored program material. These functions enable the viewer to pause the program playback whenever he desires, fast forward through unwanted program material or commercials, and to replay favorite scenes. However, a VCR cannot both capture and play back information at the same time.

One approach to solving this problem is to use several VCRs. For example, if two video tape recorders are available, it might be possible to Ping-Pong between the two. In this case, the first recorder is started at the beginning of the program of interest. If the viewer wishes to rewind the broadcast, the second recorder begins recording, while the first recorder is halted, rewound to the appropriate place, and playback initiated. However, at least a third video tape recorder is required if the viewer wishes to fast forward to some point in time after the initial rewind was requested. In this case, the third recorder starts recording the broadcast stream while the second is halted and rewound to the appropriate position. Continuing this exercise, one can quickly see that the equipment becomes unwieldy, unreliable, expensive, and hard to operate, while never supporting all desired functions. In addition, tapes are of finite length, and may potentially end at inconvenient times, drastically lowering the value of the solution.

The use of digital computer systems to solve this problem has been suggested. U.S. Pat. No. 5,371,551 issued to Logan et al., on 6 Dec. 1994, teaches a method for concurrent video recording and playback. It presents a microprocessor controlled broadcast and playback device. Said device compresses and stores video data onto a hard disk. However, this approach is difficult to implement because the processor requirements for keeping up with the high video rates makes the device expensive and problematic. The microprocessor must be extremely fast to keep up with the incoming and outgoing video data.

More recently, digital videos recorders (DVR) have emerged in the marketplace that are based on structures beyond what was previously conceived. One example is U.S. Pat. No. 6,233,389 owned by the Applicant. There are a number of technology trends in force today that are continuing to expand the opportunities for DVR functionality. These trends, whose initial existence directly led to the invention of the DVR, are: the increasing density of gates on semiconductor media; and the increasing density of magnetic storage on hard drive platters.

Two recent announcements bring home these trends with full force.

Until recently, it was believed that the theoretical limit on hard drive platter storage density was 100 Gbits per square inch. This was due to the small number of atoms magnetized at that density versus the effects of parsistic magnetization, which would cause the magnetization to be randomized over short time periods. IBM Corporation recently announced that, by the addition of particlized ferromagnetic material to the platter surface ("pixie dust"), they could achieve 100 times the bit density, or 10 Tbits per square inch. This implies that on a one-inch microdrive (a size that allows placing the drive into a PCMCIA form factor), a density of over 500 GBytes is theoretically possible. This capacity results in over 500 hours of video storage for a typical DVR.

In the semiconductor industry, theoretical limits on chip density have come and gone many times, most of the most recent beliefs was that optical lithography could not etch fine enough lines on silicon. Intel Corporation recently announced that it has developed a transistor ten times smaller than any previously fabricated, from which chips 100 times denser than today's could be developed.

SUMMARY OF THE INVENTION

The invention provides a transportable digital video recorder system. The invention gives a user the ability to record and play back TV broadcast programs and digital video using a compact portable small form factor transportable digital video recorder package. In addition, the invention allows the user to store selected television broadcast programs while the user is simultaneously watching or reviewing another program.

A preferred embodiment of the invention provides a small form factor transportable digital video recorder containing a processor and persistent storage device storing a plurality of digital streams. The small form factor transportable digital video recorder is inserted into a receiving device or a docking station and will only operate with an authorized receiving device or docking station.

The invention allows a receiving device to select a specific digital stream from the persistent storage device. The specific digital stream is then output from the small form factor transportable digital video recorder to the receiving device where the receiving device displays the digital stream to a user. User control commands are accepted via the receiving device and sent through the small form factor transportable digital video recorder system. These commands affect the flow of digital streams output to the receiving device and allow the user to view and listen to stored digital streams with at least the following functions: variable rate fast forward and rewind, frame step, index, pause, variable rate reverse play, variable rate play, and play.

The small form factor transportable digital video recorder receives analog signals and digital video signals from the receiving device and converts them into digital streams which are stored on the persistent storage device.

Another embodiment of the invention provides a plurality of input signal tuners on the small form factor transportable digital video recorder. The input tuners accept analog and digital television broadcast signals and can be individually tuned to a specific broadcast signal. The analog and digital television broadcast signals are converted into digital streams and stored on the persistent storage device.

An electronic program guide is also stored on the persistent storage device which the small form factor transportable digital video recorder delivers portions of to the receiving device upon request from the receiving device.

A docking station comprises at least one small form factor transportable digital video recorder slot allowing a user to backup and transfer specific data between small form factor transportable digital video recorders. The small form factor transportable digital video recorders authenticate each other before transferring data. The docking station also allows a user to transfer data stored on the docking station to a small form factor transportable digital video recorder.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a transportable digital video recorder system. A system according to the invention gives a user the ability to record and play back TV broadcast programs and digital video using a compact portable small form factor package. The invention additionally provides the user with the ability to store selected television broadcast programs while simultaneously watching or reviewing another program and to view stored programs with at least the following functions: variable rate fast forward and rewind, frame step, index, pause, variable rate reverse play, variable rate play, and play.

Figure 1:
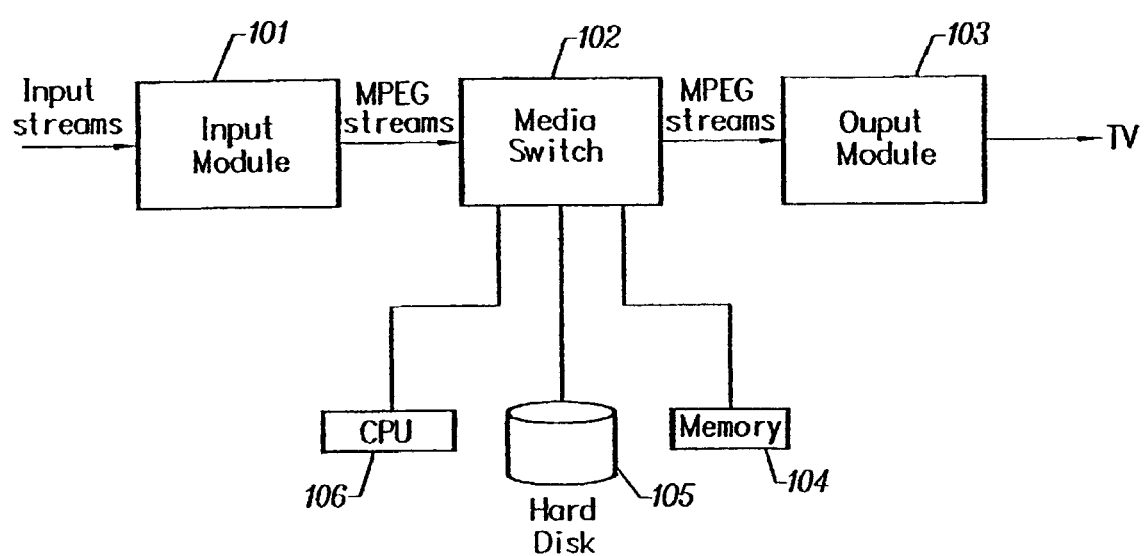
FIG. 1 is a block schematic diagram of a high level view of a preferred embodiment of the invention according to the invention.

Referring to FIG. 1, a preferred embodiment of the invention has an Input Section 101, Media Switch 102, and an Output Section 103. The Input Section 101 takes television (TV) input streams in a multitude of forms, for example, National Television Standards Committee (NTSC) or PAL broadcast, and digital forms such as Digital Satellite System (DSS), Digital Broadcast Services (DBS), or Advanced Television Standards Committee (ATSC). DBS, DSS and ATSC are based on standards called Moving Pictures Experts Group 2 (MPEG2) and MPEG2 Transport. MPEG2 Transport is a standard for formatting the digital data stream from the TV source transmitter so that a TV receiver can disassemble the input stream to find programs in the multiplexed signal. The Input Section 101 produces MPEG streams. An MPEG2 transport multiplex supports multiple programs in the same broadcast channel, with multiple video and audio feeds and private data. The Input Section 101 tunes the channel to a particular program, extracts a specific MPEG program out of it, and feeds it to the rest of the system. Analog TV signals are encoded into a similar MPEG format using separate video and audio encoders, such that the remainder of the system is unaware of how the signal was obtained. Information may be modulated into the Vertical Blanking Interval (VBI) of the analog TV signal in a number of standard ways; for example, the North American Broadcast Teletext Standard (NABTS) may be used to modulate information onto lines 10 through 20 of an NTSC signal, while the FCC mandates the use of line 21 for Closed Caption (CC) and Extended Data Services (EDS). Such signals are decoded by the input section and passed to the other sections as if they were delivered via an MPEG2 private data channel.

The Media Switch 102 mediates between a microprocessor CPU 106, hard disk or storage device 105, and memory 104. Input streams are converted to an MPEG stream and sent to the Media Switch 102. The Media Switch 102 buffers the MPEG stream into memory. It then performs two operations if the user is watching real time TV: the stream is sent to the Output Section 103 and it is written simultaneously to the hard disk or storage device 105.

The Output Section 103 takes MPEG streams as input and produces an analog TV signal according to the NTSC, PAL, or other required TV standards. The Output Section 103 contains an MPEG decoder, On-Screen Display (OSD) generator, analog TV encoder and audio logic. The OSD generator allows the program logic to supply images which will be overlayed on top of the resulting analog TV signal. Additionally, the Output Section can modulate information supplied by the program logic onto the VBI of the output signal in a number of standard formats, including NABTS, CC and EDS.

Figure 2:
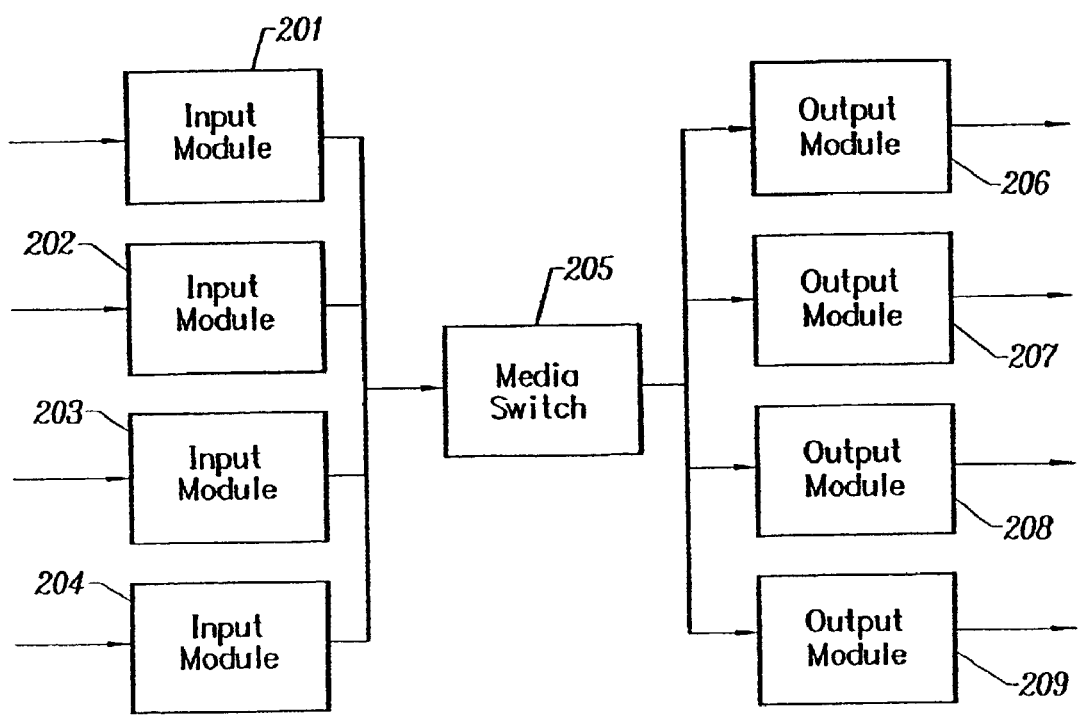
FIG. 2 is a block schematic diagram of a preferred embodiment of the invention using multiple input and output modules according to the invention.

With respect to FIG. 2, the invention easily expands to accommodate multiple Input Sections (tuners) 201, 202, 203, 204, each can be tuned to different types of input. Multiple Output Modules (decoders) 206, 207, 208, 209 are added as well. Special effects such as picture in a picture can be implemented with multiple decoders. The Media Switch 205 records one program while the user is watching another. This means that a stream can be extracted off the disk while another stream is being stored onto the disk.

Figure 3:
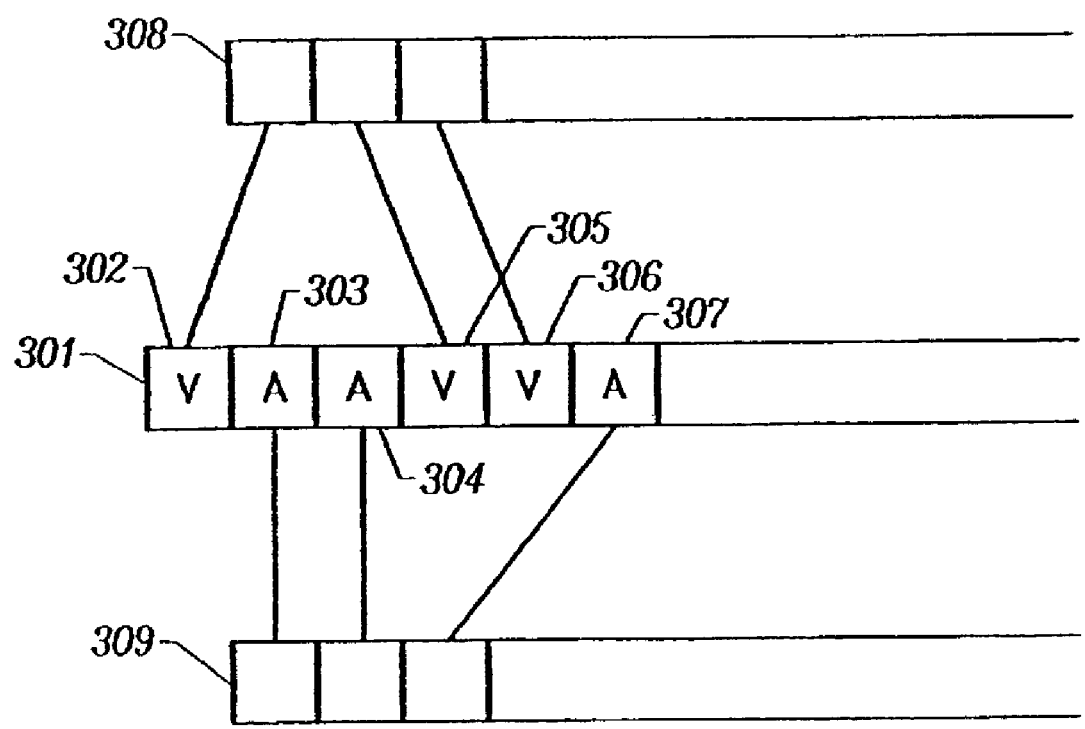
FIG. 3 is a schematic diagram of an Moving Pictures Experts Group (MPEG) data stream and its video and audio components according to the invention.

Referring to FIG. 3, the incoming MPEG stream 301 has interleaved video 302, 305, 306 and audio 303, 304, 307 segments. These elements must be separated and recombined to create separate video 308 and audio 309 streams or buffers. This is necessary because separate decoders are used to convert MPEG elements back into audio or video analog components. Such separate delivery requires that time sequence information be generated so that the decoders may be properly synchronized for accurate playback of the signal.

The Media Switch enables the program logic to associate proper time sequence information with each segment, possibly embedding it directly into the stream. The time sequence information for each segment is called a time stamp. These time stamps are monotonically increasing and start at zero each time the system boots up. This allows the invention to find any particular spot in any particular video segment. For example, if the system needs to read five seconds into an incoming contiguous video stream that is being cached, the system simply has to start reading forward into the stream and look for the appropriate time stamp.

A binary search can be performed on a stored file to index into a stream. Each stream is stored as a sequence of fixed-size segments enabling fast binary searches because of the uniform timestamping. If the user wants to start in the middle of the program, the system performs a binary search of the stored segments until it finds the appropriate spot, obtaining the desired results with a minimal amount of information. If the signal were instead stored as an MPEG stream, it would be necessary to linearly parse the stream from the beginning to find the desired location.

Figure 4:
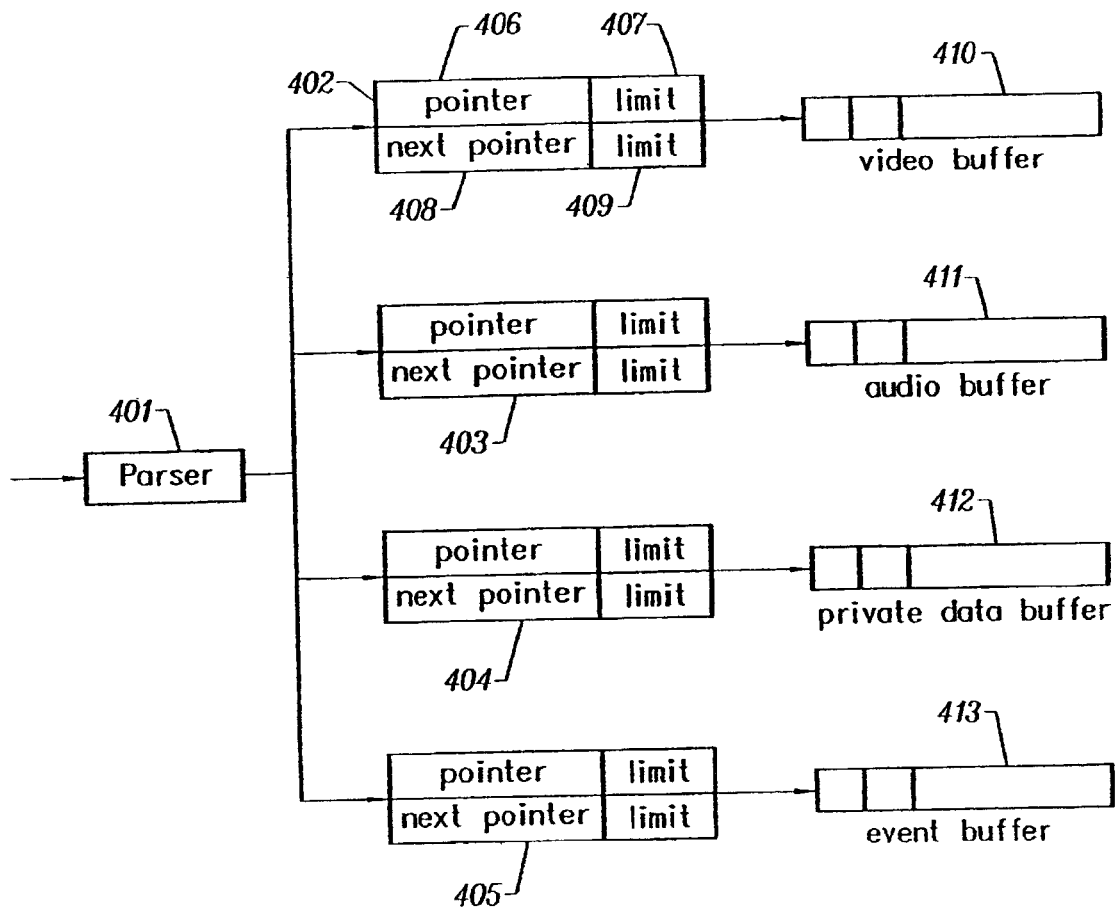
FIG. 4 is a block schematic diagram of a parser and four direct memory access (DMA) input engines contained in the Media Switch according to the invention.

With respect to FIG. 4, the Media Switch contains four input Direct Memory Access (DMA) engines 402, 403, 404, 405 each DMA engine has an associated buffer 410, 411, 412, 413. Conceptually, each DMA engine has a pointer 406, a limit for that pointer 407, a next pointer 408, and a limit for the next pointer 409. Each DMA engine is dedicated to a particular type of information, for example, video 402, audio 403, and parsed events 405. The buffers 410, 411, 412, 413 are circular and collect the specific information. The DMA engine increments the pointer 406 into the associated buffer until it reaches the limit 407 and then loads the next pointer 408 and limit 409. Setting the pointer 406 and next pointer 408 to the same value, along with the corresponding limit value creates a circular buffer. The next pointer 408 can be set to a different address to provide vector DMA.

The input stream flows through a parser 401. The parser 401 parses the stream looking for MPEG distinguished events indicating the start of video, audio or private data segments. For example, when the parser 401 finds a video event, it directs the stream to the video DMA engine 402. The parser 401 buffers up data and DMAs it into the video buffer 410 through the video DMA engine 402. At the same time, the parser 401 directs an event to the event DMA engine 405 which generates an event into the event buffer 413. When the parser 401 sees an audio event, it redirects the byte stream to the audio DMA engine 403 and generates an event into the event buffer 413. Similarly, when the parser 401 sees a private data event, it directs the byte stream to the private data DMA engine 404 and directs an event to the event buffer 413. The Media Switch notifies the program logic via an interrupt mechanism when events are placed in the event buffer.

Figure 5:
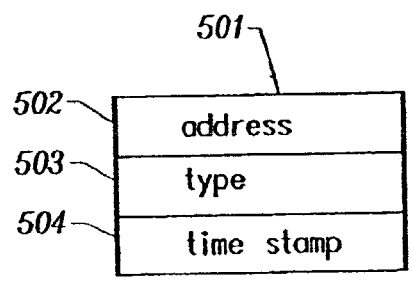
FIG. 5 is a schematic diagram of the components of a packetized elementary stream (PES) buffer according to the invention.

Referring to FIGS. 4 and 5, the event buffer 413 is filled by the parser 401 with events. Each event 501 in the event buffer has an offset 502, event type 503, and time stamp field 504. The parser 401 provides the type and offset of each event as it is placed into the buffer. For example, when an audio event occurs, the event type field is set to an audio event and the offset indicates the location in the audio buffer 411. The program logic knows where the audio buffer 411 starts and adds the offset to find the event in the stream. The address offset 502 tells the program logic where the next event occurred, but not where it ended. The previous event is cached so the end of the current event can be found as well as the length of the segment.

Figure 6:
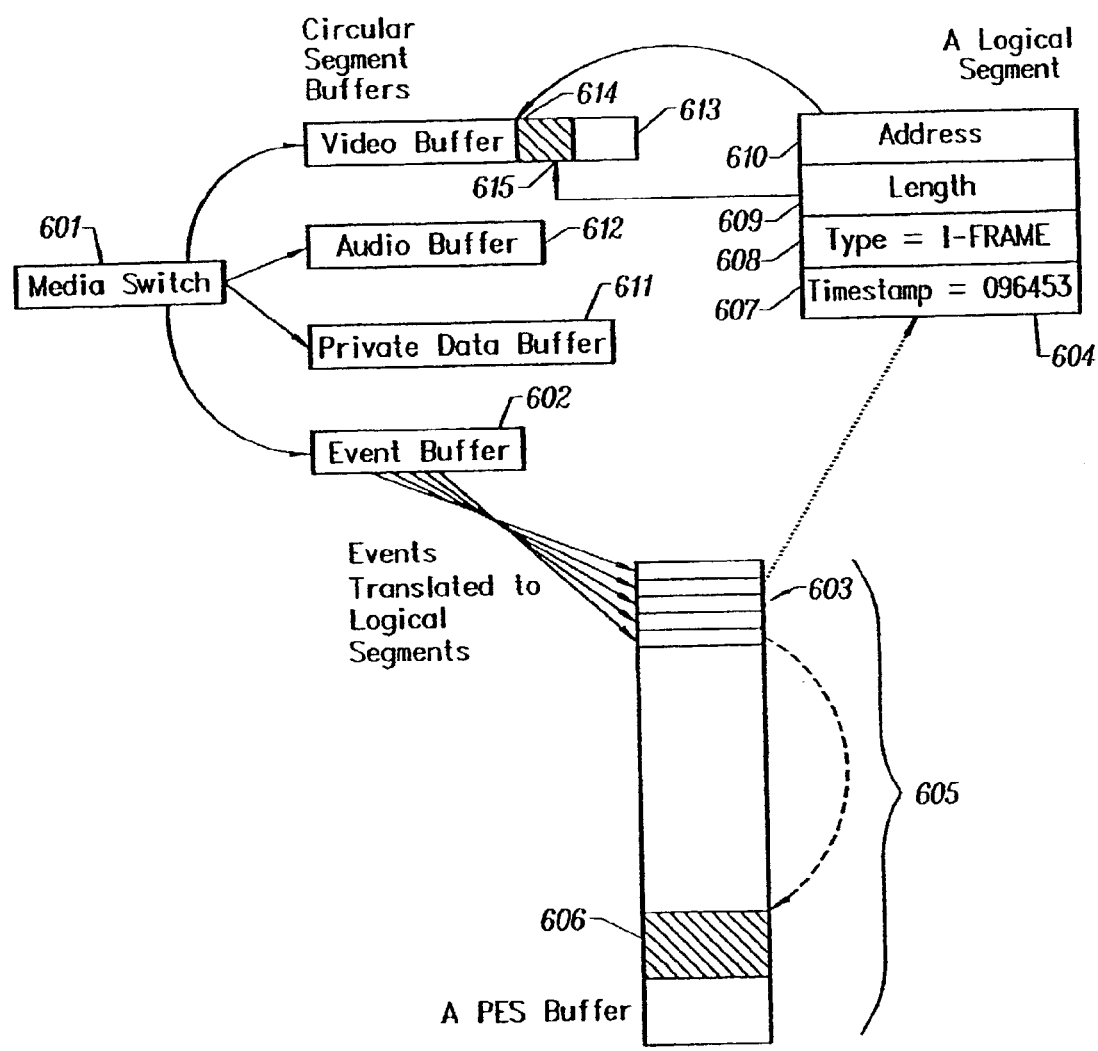
FIG. 6 is a schematic diagram of the construction of a PES buffer from the parsed components in the Media Switch output circular buffers.

With respect to FIGS. 5 and 6, the program logic reads accumulated events in the event buffer 602 when it is interrupted by the Media Switch 601. From these events the program logic generates a sequence of logical segments 603 which correspond to the parsed MPEG segments 615. The program logic converts the offset 502 into the actual address 610 of each segment, and records the event length 609 using the last cached event. If the stream was produced by encoding an analog signal, it will not contain Program Time Stamp (PTS) values, which are used by the decoders to properly present the resulting output. Thus, the program logic uses the generated time stamp 504 to calculate a simulated PTS for each segment and places that into the logical segment timestamp 607. In the case of a digital TV stream, PTS values are already encoded in the stream. The program logic extracts this information and places it in the logical segment timestamp 607.

The program logic continues collecting logical segments 603 until it reaches the fixed buffer size. When this occurs, the program logic generates a new buffer, called a Packetized Elementary Stream (PES) 605 buffer containing these logical segments 603 in order, plus ancillary control information. Each logical segment points 604 directly to the circular buffer, e.g., the video buffer 613, filled by the Media Switch 601. This new buffer is then passed to other logic components, which may further process the stream in the buffer in some way, such as presenting it for decoding or writing it to the storage media. Thus, the MPEG data is not copied from one location in memory to another by the processor. This results in a more cost effective design since lower memory bandwidth and processor bandwidth is required.

A unique feature of the MPEG stream transformation into PES buffers is that the data associated with logical segments need not be present in the buffer itself, as presented above. When a PES buffer is written to storage, these logical segments are written to the storage medium in the logical order in which they appear. This has the effect of gathering components of the stream, whether they be in the video, audio or private data circular buffers, into a single linear buffer of stream data on the storage medium. The buffer is read back from the storage medium with a single transfer from the storage media, and the logical segment information is updated to correspond with the actual locations in the buffer 606. Higher level program logic is unaware of this transformation, since it handles only the logical segments, thus stream data is easily managed without requiring that the data ever be copied between locations in DRAM by the CPU.

A unique aspect of the Media Switch is the ability to handle high data rates effectively and inexpensively. It performs the functions of taking video and audio data in, sending video and audio data out, sending video and audio data to disk, and extracting video and audio data from the disk on a low cost platform. Generally, the Media Switch runs asynchronously and autonomously with the microprocessor CPU, using its DMA capabilities to move large quantities of information with minimal intervention by the CPU.

Figure 7:
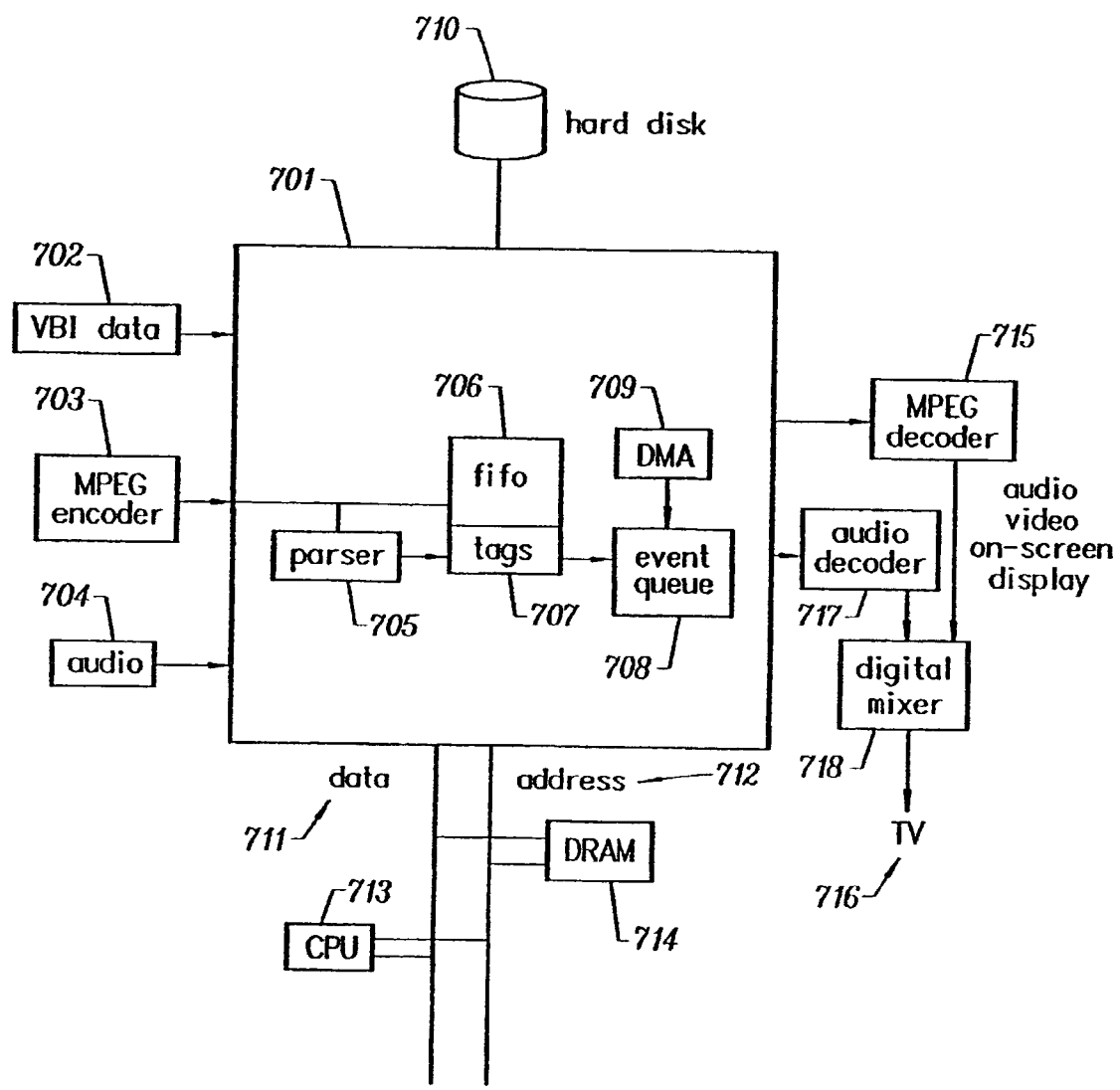
FIG. 7 is a block schematic diagram of the Media Switch and the various components that it communicates with according to the invention.

Referring to FIG. 7, the input side of the Media Switch 701 is connected to an MPEG encoder 703. There are also circuits specific to MPEG audio 704 and vertical blanking interval (VBI) data 702 feeding into the Media Switch 701. If a digital TV signal is being processed instead, the MPEG encoder 703 is replaced with an MPEG2 Transport Demultiplexor, and the MPEG audio encoder 704 and VBI decoder 702 are deleted. The demultiplexor multiplexes the extracted audio, video and private data channel streams through the video input Media Switch port.

The parser 705 parses the input data stream from the MPEG encoder 703, audio encoder 704 and VBI decoder 702, or from the transport demultiplexor in the case of a digital TV stream. The parser 705 detects the beginning of all of the important events in a video or audio stream, the start of all of the frames, the start of sequence headers—all of the pieces of information that the program logic needs to know about in order to both properly play back and perform special effects on the stream, e.g. fast forward, reverse, play, pause, fast/slow play, indexing, and fast/slow reverse play.

The parser 705 places tags 707 into the FIFO 706 when it identifies video or audio segments, or is given private data. The DMA 709 controls when these tags are taken out. The tags 707 and the DMA addresses of the segments are placed into the event queue 708. The frame type information, whether it is a start of a video I-frame, video B-frame, video P-frame, video PES, audio PES, a sequence header, an audio frame, or private data packet, is placed into the event queue 708 along with the offset in the related circular buffer where the piece of information was placed. The program logic operating in the CPU 713 examines events in the circular buffer after it is transferred to the DRAM 714.

The Media Switch 701 has a data bus 711 that connects to the CPU 713 and DRAM 714. An address bus 712 is also shared between the Media Switch 701, CPU 713, and DRAM 714. A hard disk or storage device 710 is connected to one of the ports of the Media Switch 701. The Media Switch 701 outputs streams to an MPEG video decoder 715 and a separate audio decoder 717. The audio decoder 717 signals contain audio cues generated by the system in response to the user's commands on a remote control or other internal events. The decoded audio output from the MPEG decoder is digitally mixed 718 with the separate audio signal. The resulting signals contain video, audio, and on-screen displays and are sent to the TV 716.

The Media Switch 701 takes in 8-bit data and sends it to the disk, while at the same time extracts another stream of data off of the disk and sends it to the MPEG decoder 715. All of the DMA engines described above can be working at the same time. The Media Switch 701 can be implemented in hardware using a Field Programmable Gate Array (FPGA), ASIC, or discrete logic.

Rather than having to parse through an immense data stream looking for the start of where each frame would be, the program logic only has to look at the circular event buffer in DRAM 714 and it can tell where the start of each frame is and the frame type. This approach saves a large amount of CPU power, keeping the real time requirements of the CPU 713 small. The CPU 713 does not have to be very fast at any point in time. The Media Switch 701 gives the CPU 713 as much time as possible to complete tasks. The parsing mechanism 705 and event queue 708 decouple the CPU 713 from parsing the audio, video, and buffers and the real time nature of the streams, which allows for lower costs. It also allows the use of a bus structure in a CPU environment that operates at a much lower clock rate with much cheaper memory than would be required otherwise.

The CPU 713 has the ability to queue up one DMA transfer and can set up the next DMA transfer at its leisure. This gives the CPU 713 large time intervals within which it can service the DMA controller 709. The CPU 713 may respond to a DMA interrupt within a larger time window because of the large latency allowed. MPEG streams, whether extracted from an MPEG2 Transport or encoded from an analog TV signal, are typically encoded using a technique called Variable Bit Rate encoding (VBR). This technique varies the amount of data required to represent a sequence of images by the amount of movement between those images. This technique can greatly reduce the required bandwidth for a signal, however sequences with rapid movement (such as a basketball game) may be encoded with much greater bandwidth requirements. For example, the Hughes DirecTV satellite system encodes signals with anywhere from 1 to 10 Mb/s of required bandwidth, varying from frame to frame. It would be difficult for any computer system to keep up with such rapidly varying data rates without this structure.

Figure 8:
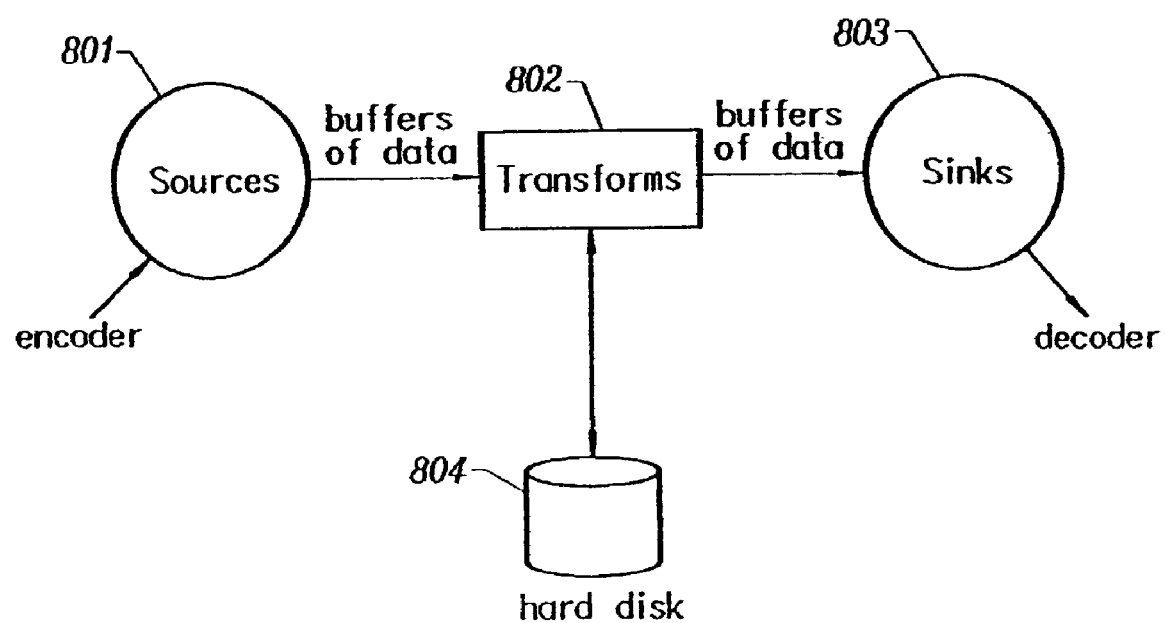
FIG. 8 is a block schematic diagram of a high level view of the program logic according to the invention.

With respect to FIG. 8, the program logic within the CPU has three conceptual components: sources 801, transforms 802, and sinks 803. The sources 801 produce buffers of data. Transforms 802 process buffers of data and sinks 803 consume buffers of data. A transform is responsible for allocating and queuing the buffers of data on which it will operate. Buffers are allocated as if "empty" to sources of data, which give them back "full". The buffers are then queued and given to sinks as "full", and the sink will return the buffer "empty".

A source 801 accepts data from encoders, e.g., a digital satellite receiver. It acquires buffers for this data from the downstream transform, packages the data into a buffer, then pushes the buffer down the pipeline as described above. The source object 801 does not know anything about the rest of the system. The sink 803 consumes buffers, taking a buffer from the upstream transform, sending the data to the decoder, and then releasing the buffer for reuse.

There are two types of transforms 802 used: spatial and temporal. Spatial transforms are transforms that perform, for example, an image convolution or compression/decompression on the buffered data that is passing through. Temporal transforms are used when there is no time relation that is expressible between buffers going in and buffers coming out of a system. Such a transform writes the buffer to a file 804 on the storage medium. The buffer is pulled out at a later time, sent down the pipeline, and properly sequenced within the stream.

Figure 9:
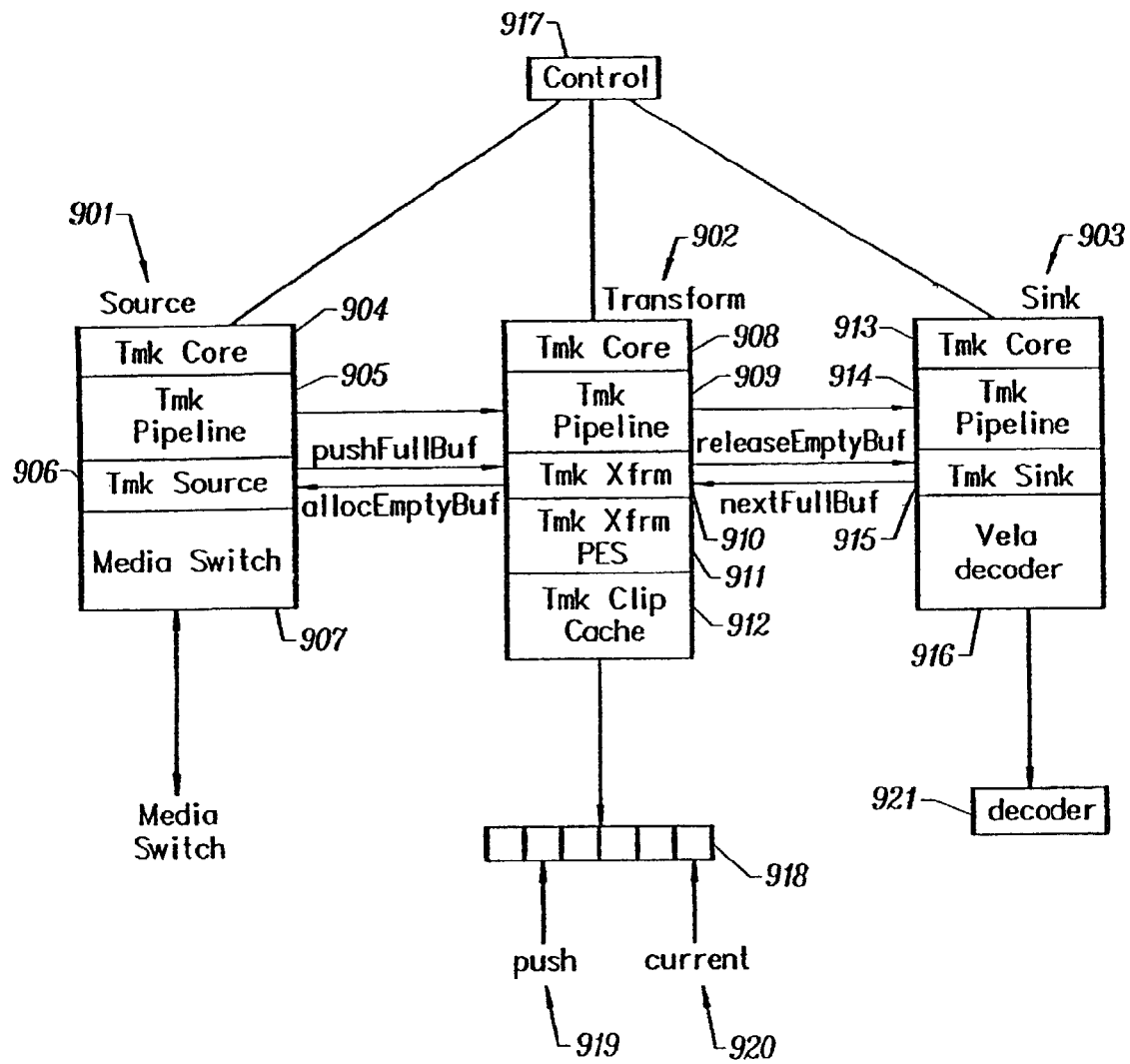
FIG. 9 is a block schematic diagram of a class hierarchy of the program logic according to the invention.

Referring to FIG. 9, a C++ class hierarchy derivation of the program logic is shown. The TiVo Media Kernel (Tmk) 904, 908, 913 mediates with the operating system kernel. The kernel provides operations such as: memory allocation, synchronization, and threading. The TmkCore 904, 908, 913 structures memory taken from the media kernel as an object. It provides operators, new and delete, for constructing and deconstructing the object. Each object (source 901, transform 902, and sink 903) is multi-threaded by definition and can run in parallel.

The TmkPipeline class 905, 909, 914 is responsible for flow control through the system. The pipelines point to the next pipeline in the flow from source 901 to sink 903. To pause the pipeline, for example, an event called "pause" is sent to the first object in the pipeline. The event is relayed on to the next object and so on down the pipeline. This all happens asynchronously to the data going through the pipeline. Thus, similar to applications such as telephony, control of the flow of MPEG streams is asynchronous and separate from the streams themselves. This allows for a simple logic design that is at the same time powerful enough to support the features described previously, including pause, rewind, fast forward and others. In addition, this structure allows fast and efficient switching between stream sources, since buffered data can be simply discarded and decoders reset using a single event, after which data from the new stream will pass down the pipeline. Such a capability is needed, for example, when switching the channel being captured by the input section, or when switching between a live signal from the input section and a stored stream.

The source object 901 is a TmkSource 906 and the transform object 902 is a TmkXform 910. These are intermediate classes that define standard behaviors for the classes in the pipeline. Conceptually, they handshake buffers down the pipeline. The source object 901 takes data out of a physical data source, such as the Media Switch, and places it into a PES buffer. To obtain the buffer, the source object 901 asks the down stream object in his pipeline for a buffer (allocEmptyBuf). The source object 901 is blocked until there is sufficient memory. This means that the pipeline is self-regulating; it has automatic flow control. When the source object 901 has filled up the buffer, it hands it back to the transform 902 through the pushFullBuf function.

The sink 903 is flow controlled as well. It calls nextFullBuf which tells the transform 902 that it is ready for the next filled buffer. This operation can block the sink 903 until a buffer is ready. When the sink 903 is finished with a buffer (i.e., it has consumed the data in the buffer) it calls releaseEmptyBuf. ReleaseEmptyBuf gives the buffer back to the transform 902. The transform 902 can then hand that buffer, for example, back to the source object 901 to fill up again. In addition to the automatic flow-control benefit of this method, it also provides for limiting the amount of memory dedicated to buffers by allowing enforcement of a fixed allocation of buffers by a transform. This is an important feature in achieving a cost-effective limited DRAM environment.

The MediaSwitch class 909 calls the allocEmptyBuf method of the TmkClipCache 912 object and receives a PES buffer from it. It then goes out to the circular buffers in the Media Switch hardware and generates PES buffers. The MediaSwitch class 909 fills the buffer up and pushes it back to the TmkClipCache 912 object.

The TmkClipCache 912 maintains a cache file 918 on a storage medium. It also maintains two pointers into this cache: a push pointer 919 that shows where the next buffer coming from the source 901 is inserted; and a current pointer 920 which points to the current buffer used.

The buffer that is pointed to by the current pointer is handed to the Vela decoder class 916. The Vela decoder class 916 talks to the decoder 921 in the hardware. The decoder 921 produces a decoded TV signal that is subsequently encoded into an analog TV signal in NTSC, PAL or other analog format. When the Vela decoder class 916 is finished with the buffer it calls releaseEmptyBuf.

The structure of the classes makes the system easy to test and debug. Each level can be tested separately to make sure it performs in the appropriate manner, and the classes may be gradually aggregated to achieve the desired functionality while retaining the ability to effectively test each object.

The control object 917 accepts commands from the user and sends events into the pipeline to control what the pipeline is doing. For example, if the user has a remote control and is watching TV, the user presses pause and the control object 917 sends an event to the sink 903, that tells it pause. The sink 903 stops asking for new buffers. The current pointer 920 stays where it is at. The sink 903 starts taking buffers out again when it receives another event that tells it to play. The system is in perfect synchronization; it starts from the frame that it stopped at.

The remote control may also have a fast forward key. When the fast forward key is pressed, the control object 917 sends an event to the transform 902, that tells it to move forward two seconds. The transform 902 finds that the two second time span requires it to move forward three buffers. It then issues a reset event to the downstream pipeline, so that any queued data or state that may be present in the hardware decoders is flushed. This is a critical step, since the structure of MPEG streams requires maintenance of state across multiple frames of data, and that state will be rendered invalid by repositioning the pointer. It then moves the current pointer 920 forward three buffers. The next time the sink 903 calls nextFullBuf it gets the new current buffer. The same method works for fast reverse in that the transform 902 moves the current pointer 920 backwards.

A system clock reference resides in the decoder. The system clock reference is sped up for fast play or slowed down for slow play. The sink simply asks for full buffers faster or slower, depending on the clock speed.

Figure 10:
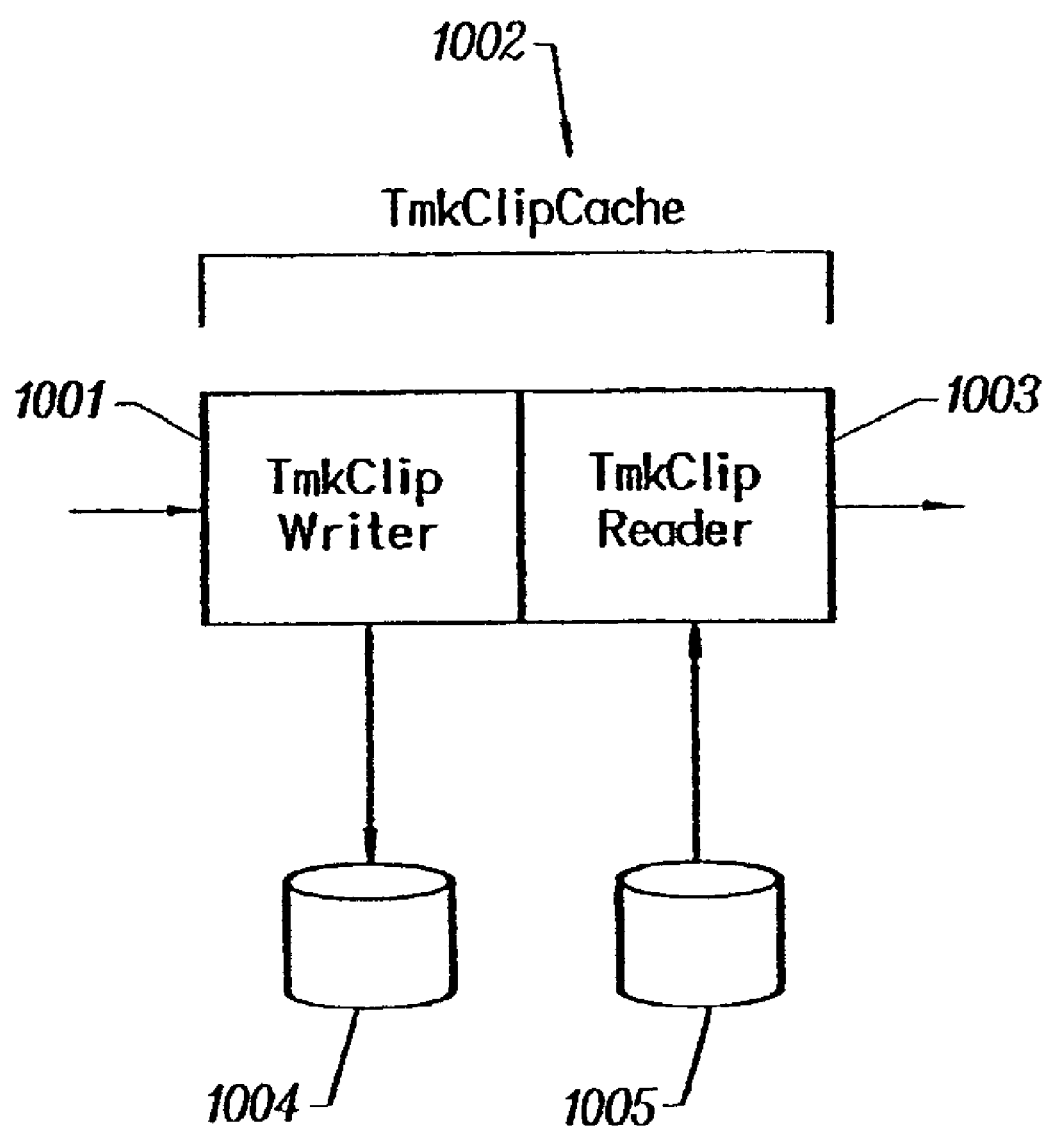
FIG. 10 is a block schematic diagram of a preferred embodiment of the clip cache component of the invention according to the invention.

With respect to FIG. 10, two other objects derived from the TmkXform class are placed in the pipeline for disk access. One is called TmkClipReader 1003 and the other is called TmkClipWriter 1001. Buffers come into the TmkClipWriter 1001 and are pushed to a file on a storage medium 1004. TmkClipReader 1003 asks for buffers which are taken off of a file on a storage medium 1005. A TmkClipReader 1003 provides only the allocEmptyBuf and pushFullBuf methods, while a TmkClipWriter 1001 provides only the nextFullBuf and releaseEmptyBuf methods. A TmkClipReader 1003 therefore performs the same function as the input, or "push" side of a TmkClipCache 1002, while a TmkClipWriter 1001 therefore performs the same function as the output, or "pull" side of a TmkClipCache 1002.

Figure 11:
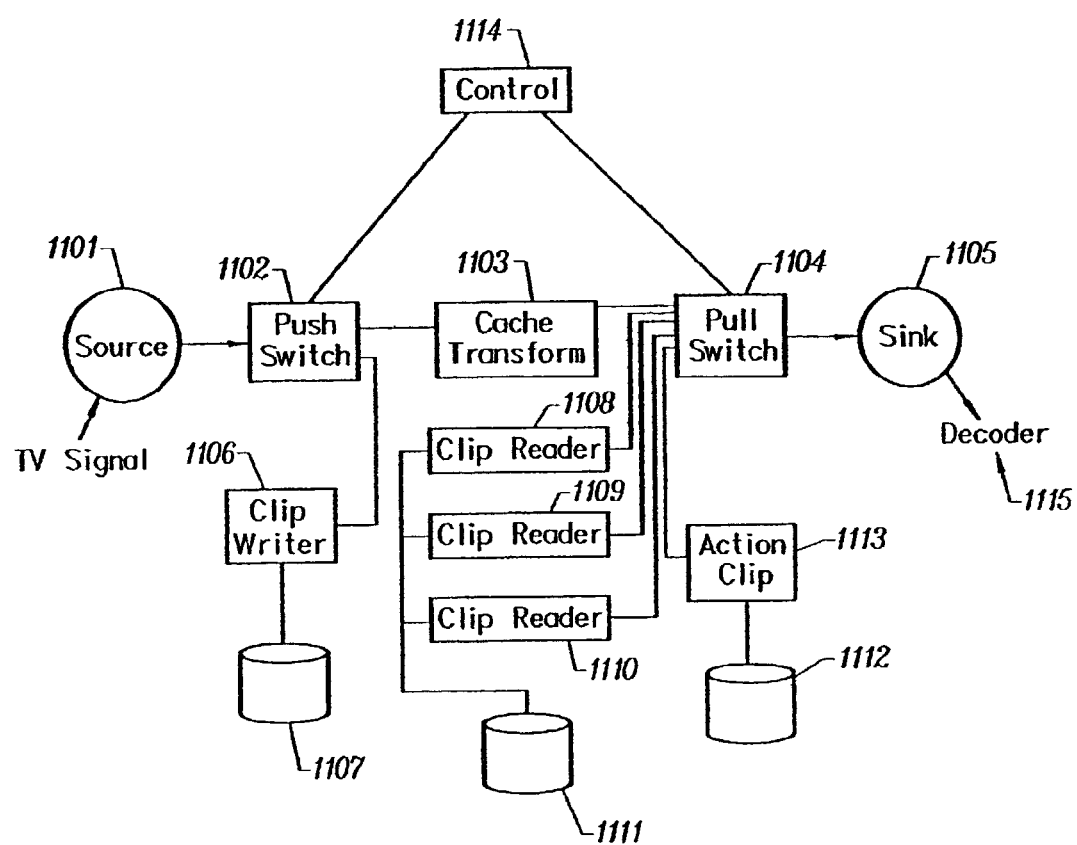
FIG. 11 is a block schematic diagram of a preferred embodiment of the invention that emulates a broadcast studio video mixer according to the invention.

Referring to FIG. 11, a preferred embodiment that accomplishes multiple functions is shown. A source 1101 has a TV signal input. The source sends data to a PushSwitch 1102 which is a transform derived from TmkXform. The PushSwitch 1102 has multiple outputs that can be switched by the control object 1114. This means that one part of the pipeline can be stopped and another can be started at the user's whim. The user can switch to different storage devices. The PushSwitch 1102 could output to a TmkClipWriter 1106, which goes onto a storage device 1107 or write to the cache transform 1103.

An important feature of this apparatus is the ease with which it can selectively capture portions of an incoming signal under the control of program logic. Based on information such as the current time, or perhaps a specific time span, or perhaps via a remote control button press by the viewer, a TmkClipWriter 1106 may be switched on to record a portion of the signal, and switched off at some later time. This switching is typically caused by sending a "switch" event to the PushSwitch 1102 object.

An additional method for triggering selective capture is through information modulated into the VBI or placed into an MPEG private data channel. Data decoded from the VBI or private data channel is passed to the program logic. The program logic examines this data to determine if the data indicates that capture of the TV signal into which it was modulated should begin. Similarly, this information may also indicate when recording should end, or another data item may be modulated into the signal indicating when the capture should end. The starting and ending indicators may be explicitly modulated into the signal or other information that is placed into the signal in a standard fashion may be used to encode this information.

Figure 12:
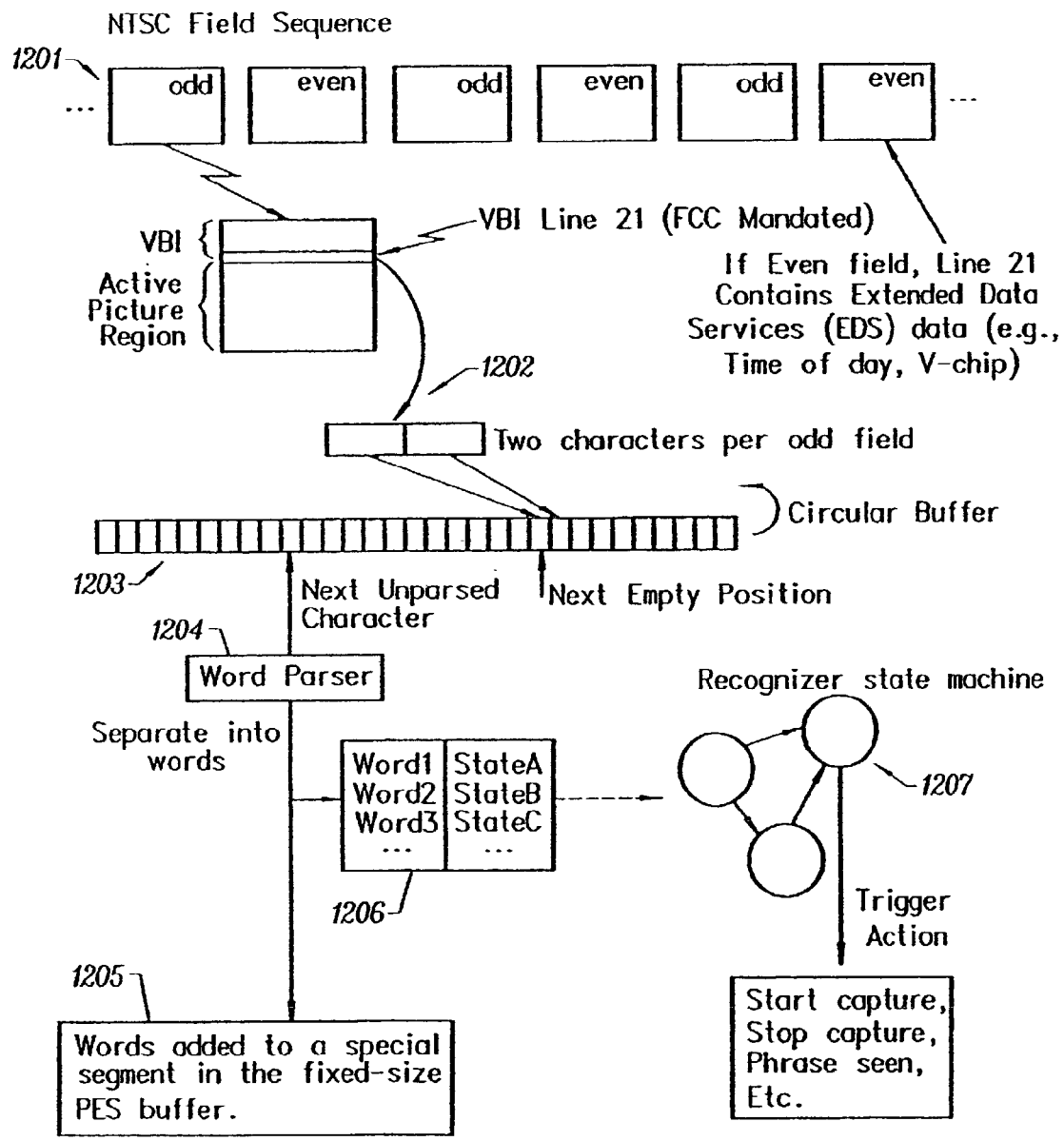
FIG. 12 is a block schematic diagram of a closed caption parser according to the invention.

With respect to FIG. 12, an example is shown which demonstrates how the program logic scans the words contained within the closed caption (CC) fields to determine starting and ending times, using particular words or phrases to trigger the capture. A stream of NTSC or PAL fields 1201 is presented. CC bytes are extracted from each odd field 1202, and entered in a circular buffer 1203 for processing by the Word Parser 1204. The Word Parser 1204 collects characters until it encounters a word boundary, usually a space, period or other delineating character. Recall from above, that the MPEG audio and video segments are collected into a series of fixed-size PES buffers. A special segment is added to each PES buffer to hold the words extracted from the CC field 1205. Thus, the CC information is preserved in time synchronization with the audio and video, and can be correctly presented to the viewer when the stream is displayed. This also allows the stored stream to be processed for CC information at the leisure of the program logic, which spreads out load, reducing cost and improving efficiency. In such a case, the words stored in the special segment are simply passed to the state table logic 1206.

During stream capture, each word is looked up in a table 1206 which indicates the action to take on recognizing that word. This action may simply change the state of the recognizer state machine 1207, or may cause the state machine 1207 to issue an action request, such as "start capture", "stop capture", "phrase seen", or other similar requests. Indeed, a recognized word or phrase may cause the pipeline to be switched; for example, to overlay a different audio track if undesirable language is used in the program.

Note that the parsing state table 1206 and recognizer state machine 1207 may be modified or changed at any time. For example, a different table and state machine may be provided for each input channel. Alternatively, these elements may be switched depending on the time of day, or because of other events.

Referring to FIG. 11, a PullSwitch is added 1104 which outputs to the sink 1105. The sink 1105 calls nextFullBuf and releaseEmptyBuf to get or return buffers from the PullSwitch 1104. The PullSwitch 1104 can have any number of inputs. One input could be an ActionClip 1113. The remote control can switch between input sources. The control object 1114 sends an event to the PullSwitch 1104, telling it to switch. It will switch from the current input source to whatever input source the control object selects.

An ActionClip class provides for sequencing a number of different stored signals in a predictable and controllable manner, possibly with the added control of viewer selection via a remote control. Thus, it appears as a derivative of a TmkXform object that accepts a "switch" event for switching to the next stored signal.

This allows the program logic or user to create custom sequences of video output. Any number of video segments can be lined up and combined as if the program logic or user were using a broadcast studio video mixer. TmkClipReaders 1108, 1109, 1110 are allocated and each is hooked into the PullSwitch 1104. The PullSwitch 1104 switches between the TmkClipReaders 1108, 1109, 1110 to combine video and audio clips. Flow control is automatic because of the way the pipeline is constructed. The Push and Pull Switches are the same as video switches in a broadcast studio.

The derived class and resulting objects described here may be combined in an arbitrary way to create a number of different useful configurations for storing, retrieving, switching and viewing of TV streams. For example, if multiple input and output sections are available, one input is viewed while another is stored, and a picture-in-picture window generated by the second output is used to preview previously stored streams. Such configurations represent a unique and novel application of software transformations to achieve the functionality expected of expensive, sophisticated hardware solutions within a single cost-effective device.

Figure 13:
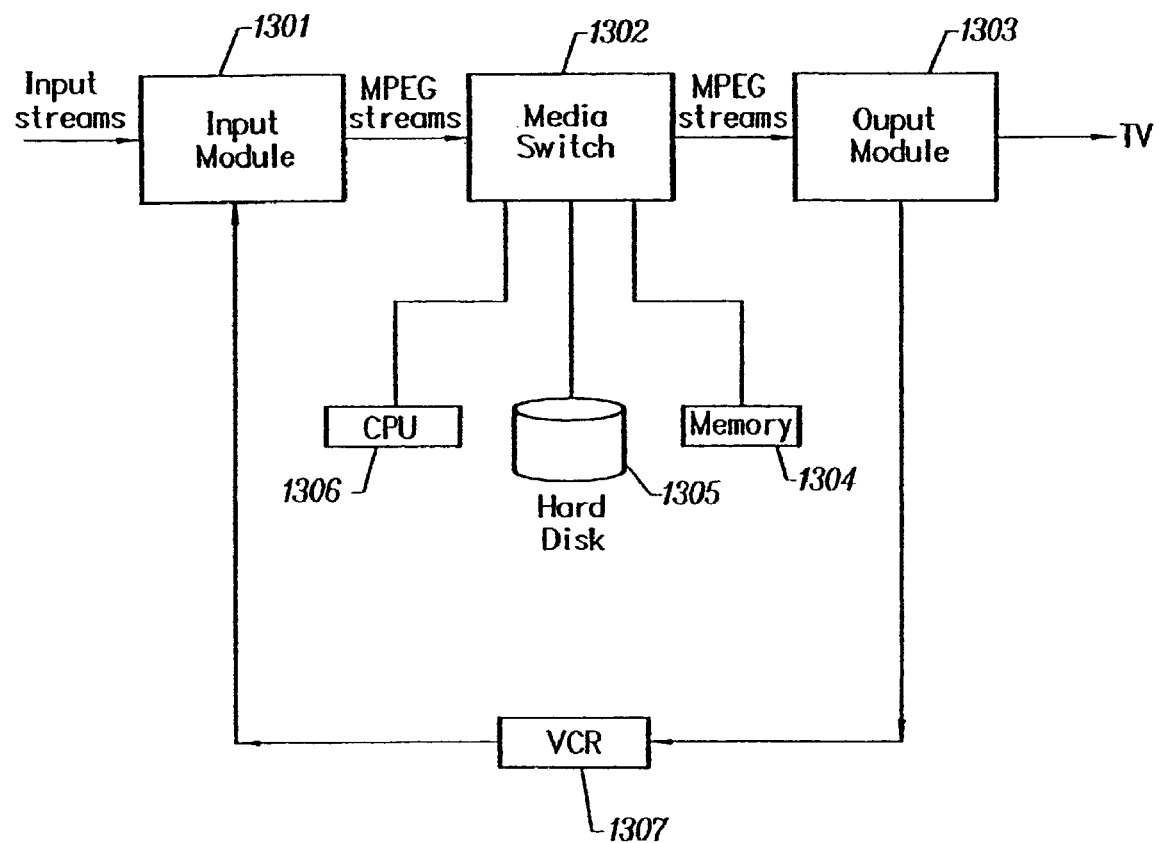
FIG. 13 is a block schematic diagram of a high level view of a preferred embodiment of the invention utilizing a VCR as an integral component of the invention according to the invention.

With respect to FIG. 13, a high-level system view is shown which implements a VCR backup. The Output Module 1303 sends TV signals to the VCR 1307. This allows the user to record TV programs directly on to video tape. The invention allows the user to queue up programs from disk to be recorded on to video tape and to schedule the time that the programs are sent to the VCR 1307. Title pages (EPG data) can be sent to the VCR 1307 before a program is sent. Longer programs can be scaled to fit onto smaller video tapes by speeding up the play speed or dropping frames.

The VCR 1307 output can also be routed back into the Input Module 1301. In this configuration the VCR acts as a backup system for the Media Switch 1302. Any overflow storage or lower priority programming is sent to the VCR 1307 for later retrieval.

The Input Module 1301 can decode and pass to the remainder of the system information encoded on the Vertical Blanking Interval (VBI). The Output Module 1303 can encode into the output VBI data provided by the remainder of the system. The program logic may arrange to encode identifying information of various kinds into the output signal, which will be recorded onto tape using the VCR 1307. Playing this tape back into the input allows the program logic to read back this identifying information, such that the TV signal recorded on the tape is properly handled. For example, a particular program may be recorded to tape along with information about when it was recorded, the source network, etc. When this program is played back into the Input Module, this information can be used to control storage of the signal, presentation to the viewer, etc.

One skilled in the art will readily appreciate that such a mechanism may be used to introduce various data items to the program logic which are not properly conceived of as television signals. For instance, software updates or other data may be passed to the system. The program logic receiving this data from the television stream may impose controls on how the data is handled, such as requiring certain authentication sequences and/or decrypting the embedded information according to some previously acquired key. Such a method works for normal broadcast signals as well, leading to an efficient means of providing non-TV control information and data to the program logic.

Additionally, one skilled in the art will readily appreciate that although a VCR is specifically mentioned above, any multimedia recording device (e.g., a Digital Video Disk-Random Access Memory (DVD-RAM) recorder) is easily substituted in its place.

Although the invention is described herein with reference to the preferred embodiment, one skilled in the art will readily appreciate that other applications may be substituted for those set forth herein without departing from the spirit and scope of the present invention. For example, the invention can be used in the detection of gambling casino crime. The input section of the invention is connected to the casino's video surveillance system. Recorded video is cached and simultaneously output to external VCRs. The user can switch to any video feed and examine (i.e., rewind, play, slow play, fast forward, etc.) a specific segment of the recorded video while the external VCRs are being loaded with the real-time input video.

Multimedia Time Warping on a Small Form Factor Transportable Digital Video Recorder The PCMCIA form factor provides a very effective vehicle for provisioning electronic capabilities. It is small, easily handled, and has a very effective docking mechanism. Similar small form-factor standardized plug-in architectures are constantly being developed, such as the Sony Memory Stick and the SD memory card. Both of these examples are now being extended to non-memory applications.

Until recently, it was believed that the theoretical limit on hard drive platter storage density was 100 Gbits per square inch. This was due to the small number of atoms magnetized at that density versus the effects of parsistic magnetization, which would cause the magnetization to be randomized over short time periods. IBM Corporation recently announced that, by the addition of particlized ferromagnetic material to the platter surface ("pixie dust"), they could achieve 100 times the bit density, or 10 Tbits per square inch. This implies that on a one-inch microdrive (a size that allows placing the drive into a PCMCIA form factor), a density of over 500 GBytes is theoretically possible. This capacity results in over 500 hours of video storage for a typical DVR.

In the semiconductor industry, theoretical limits on chip density have come and gone many times, most of the most recent beliefs was that optical lithography could not etch fine enough lines on silicon. Intel Corporation recently announced that it has developed a transistor ten times smaller than any previously fabricated, from which chips 100 times denser than today's could be developed.

Figure 14:
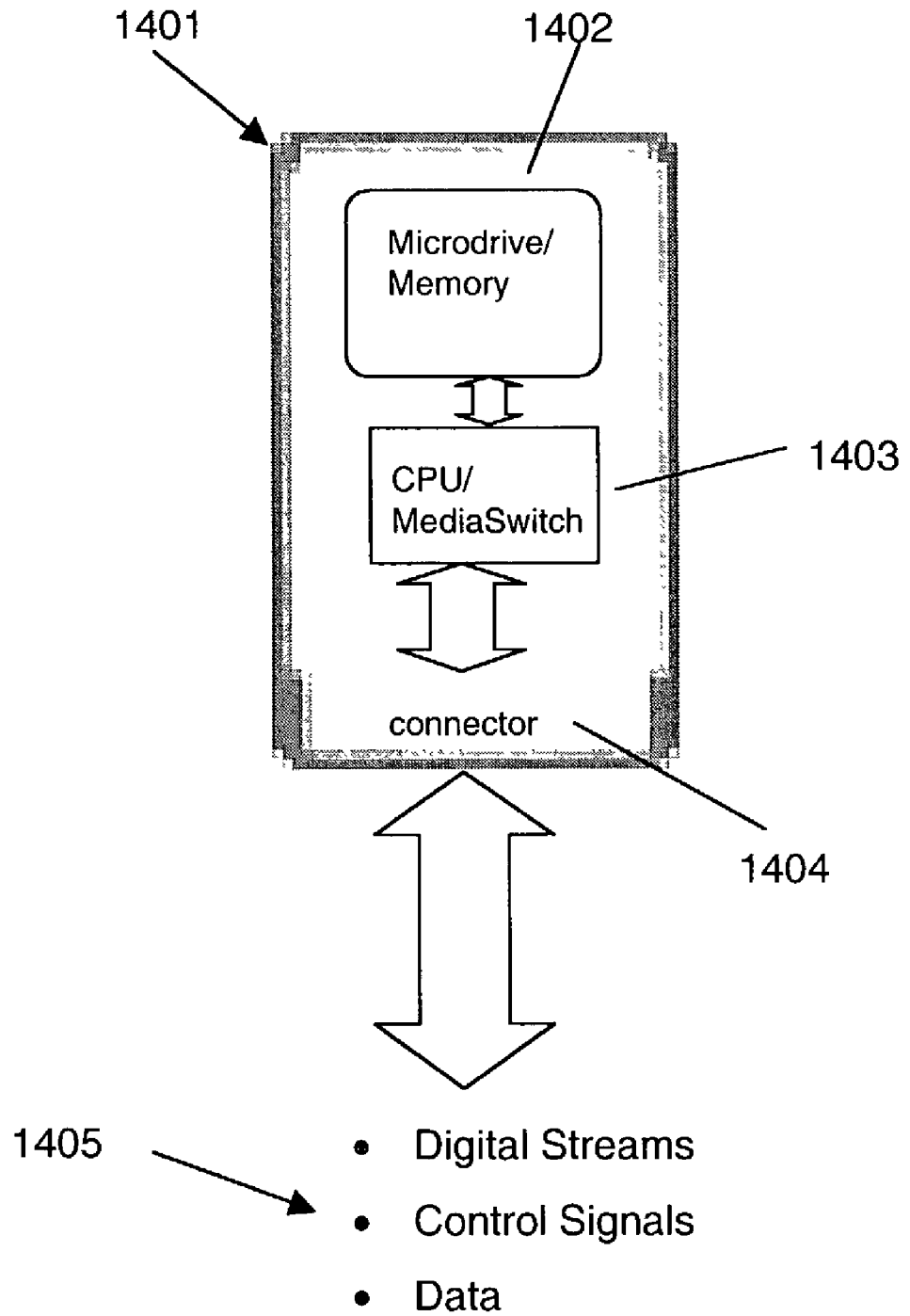
FIG. 14 is a block schematic diagram of a small form factor transportable digital video recorder embodiment of the invention according to the invention.

Referring to FIG. 14, given all of the foregoing, the invention can be incorporated into many popular plug-in formats having these basic features:

A high-density microdrive (persistent storage device) 1402 contained within the plug-in module 1401, supplemented by a large amount of DRAM for software and buffering 1402, A single chip, or small number of chips 1403, implementing the machinery needed for basic capabilities of the invention described above:
  a processor of adequate capability,
  data handling i.e., the MediaSwitch,
  disk management hardware Depending on the application, an integrated security subsystem 1403 providing secure data access and transfer.

There are several forms the small form factor transportable digital video recorder 1401 would take. In one form, the card is designed to accept digital signals 1405 for storage and retrieval. Thus, it would accept compressed digital streams and reproduce compressed digital streams. A separate control channel would be used to read information from the small form factor transportable digital video recorder 1401, such as program guide or state data, and write information to the small form factor transportable digital video recorder 1401, such as implementing trick-play modes (e.g., variable rate fast forward and rewind, frame step, index, pause, variable rate reverse play, variable rate play, and play) or updating EPG data.

Figure 15:
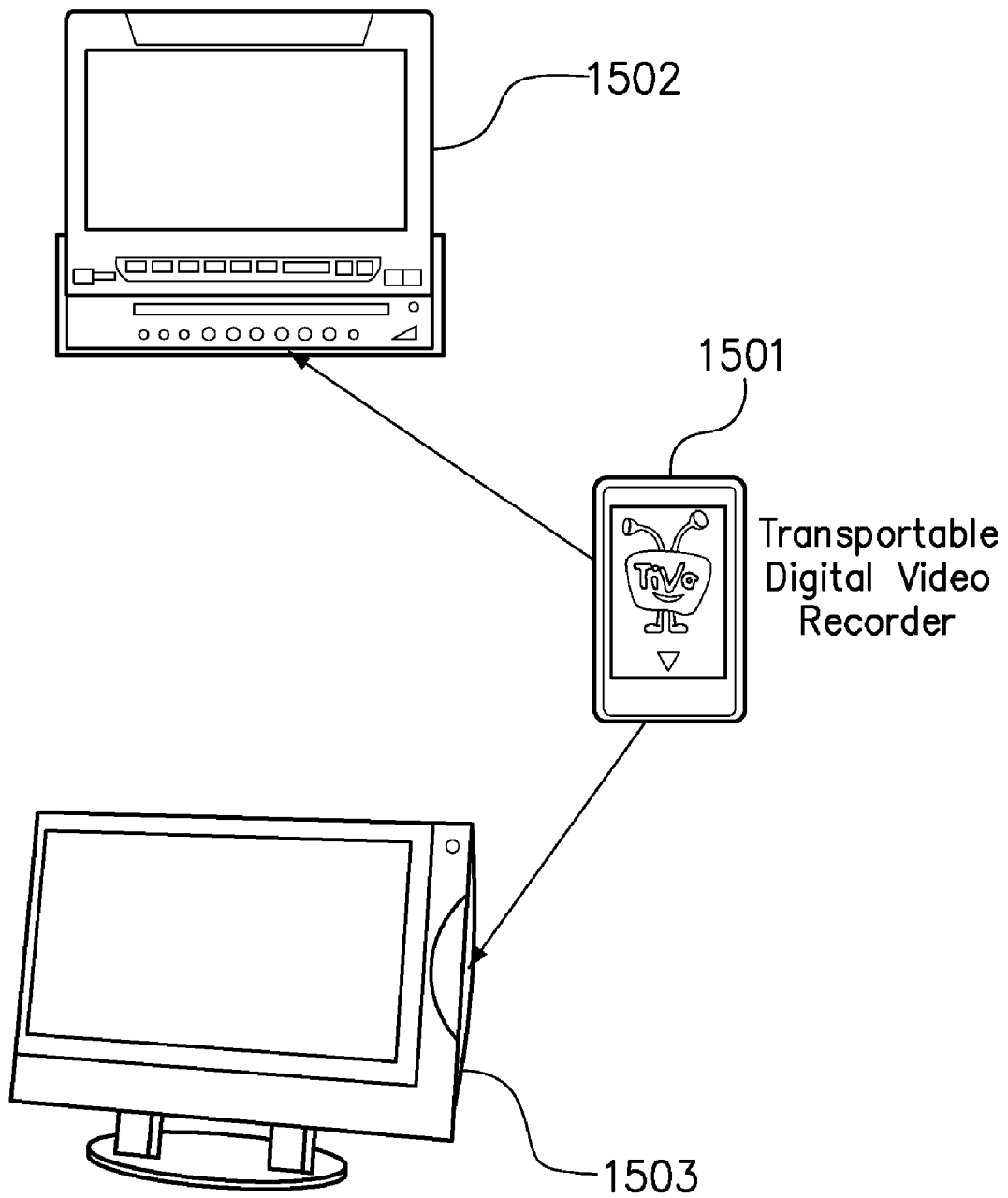
FIG. 15 is a block schematic diagram of a small form factor transportable digital video recorder embodiment of the invention interfacing with a car stereo or home entertainment system according to the invention.

With respect to FIG. 15, this form 1501 can work as an adjunct to a "docking station", for example, a home theatre receiver 1503, in-dash car stereo 1502, or back-seat video player 1502. It allows the storage of all interesting media on the small form factor transportable digital video recorder and the easy transport of it between various devices. The security subsystem is used to authenticate the docking station to the small form factor transportable digital video recorder and vice-versa, so that content protection could be assured, as well as the rights of personal use.

The docking of the small form factor transportable digital video recorder 1501 and a dock can be accomplished via directly inserting the small form factor transportable digital video recorder into a small form factor transportable digital video recorder slot built into the dock (or connected to the dock) or connected to the dock via a wired interface using USB (original and 2.0) or Firewire (IEEE 1394).

Figure 16:
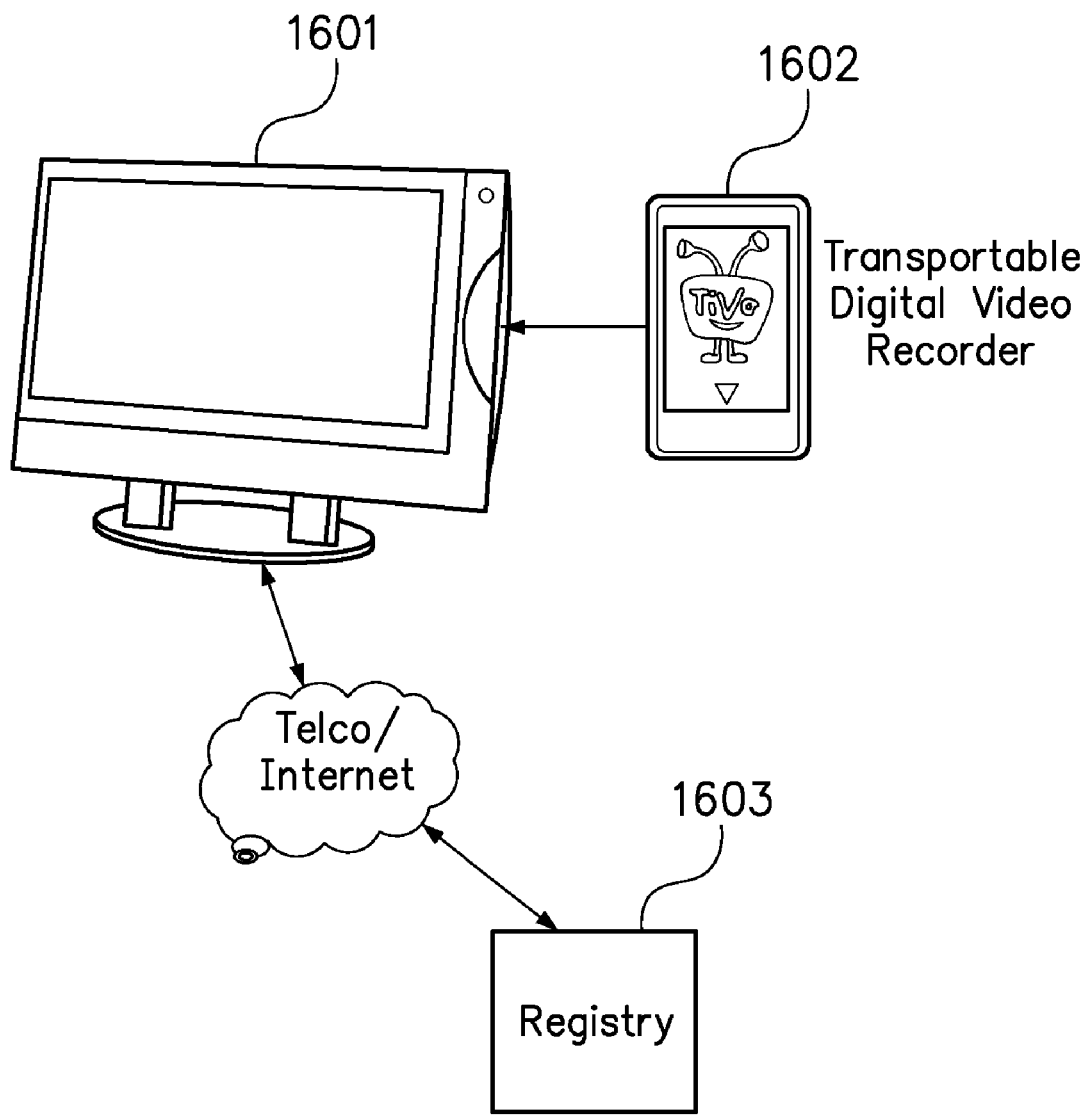
FIG. 16 is a block schematic diagram of a small form factor transportable digital video recorder embodiment of the invention interfacing with a home entertainment system and a device registry according to the invention.

Referring to FIG. 16, for example, the way in which an authentication might happen is as follows: a central registration 1603 is maintained in which the embedded, unique serial number of every registered device is maintained. A user registers a device 1601 under his ownership by having it contact the registry 1603 (assuming it has a security subsystem similar to the invention's), authenticate itself, and register the users ownership. The device 1601 also gets a copy of the small form factor transportable digital video recorder 1602 public key and its serial number. The user then has the small form factor transportable digital video recorder 1602 contact the registry 1603 (docked, of course), and the registry 1603 downloads the public keys and serial numbers of devices registered to that user. Then the dock 1601 and the small form factor transportable digital video recorder 1602 can authenticate each other whenever the small form factor transportable digital video recorder 1602 is plugged in.

Another form incorporates more of the invention's functionality described above into the card chipset 1403, for instance the encoders and decoders (and optionally tuners), and relies only on the dock to provide digitized video and audio signals, and network connections.

Still another completes the spectrum, where the dock provides analog media signals, accepts analog signals, and provides a phone connection. The small form factor transportable digital video recorder 1401 then includes the analog-to-digital conversion and the modem, as described above, in the chipset 1403.

Thus, a range of useful versions of the small form factor transportable digital video recorder and dock can be built that address different price/performance tradeoffs and evolving technology.

The Small Form Factor Transportable Digital Video Recorder and the Handheld

Figure 17:
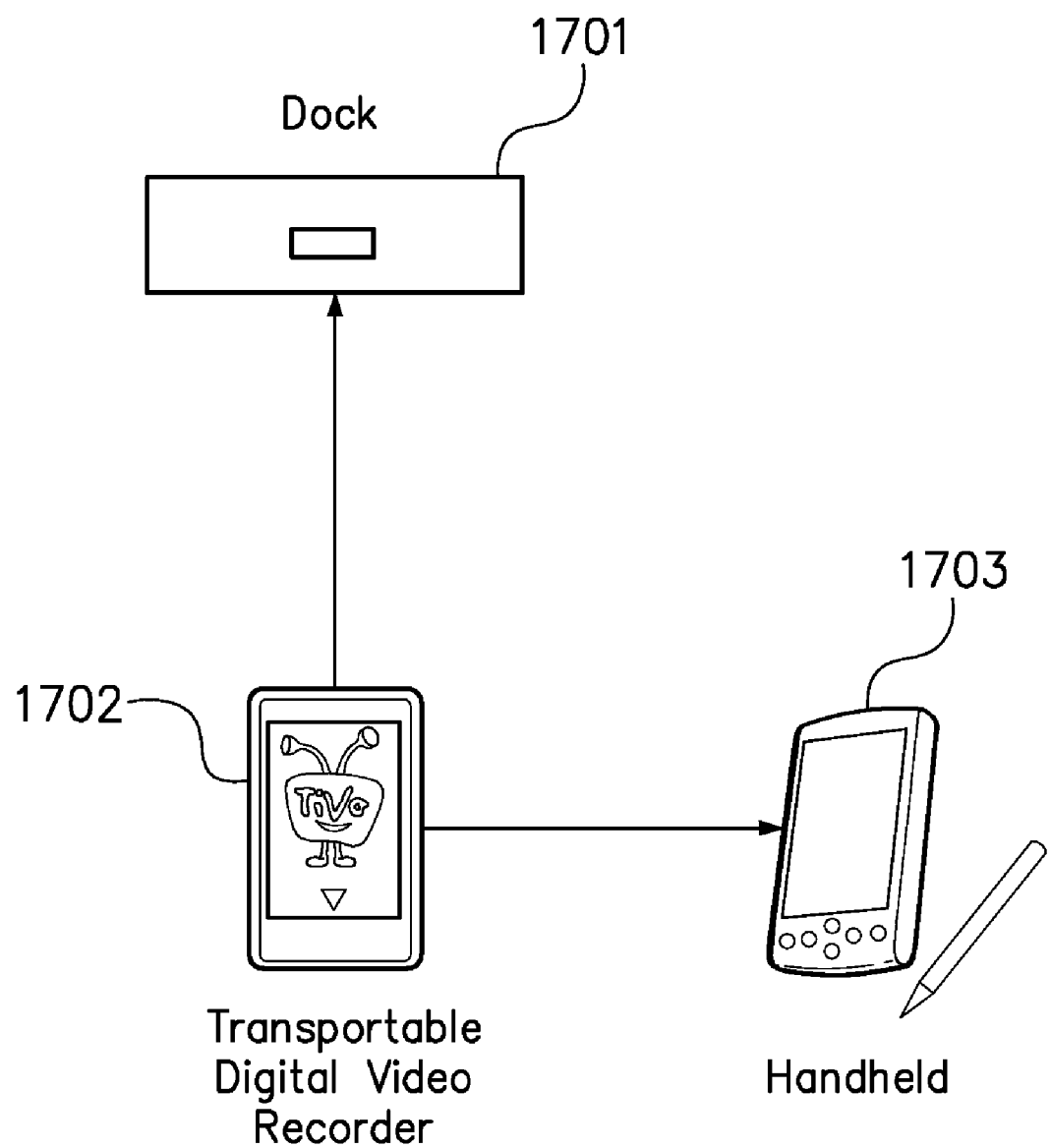
FIG. 17 is a block schematic diagram of a small form factor transportable digital video recorder embodiment of the invention using a docking station and interfacing with a handheld device according to the invention.
Figure 18:
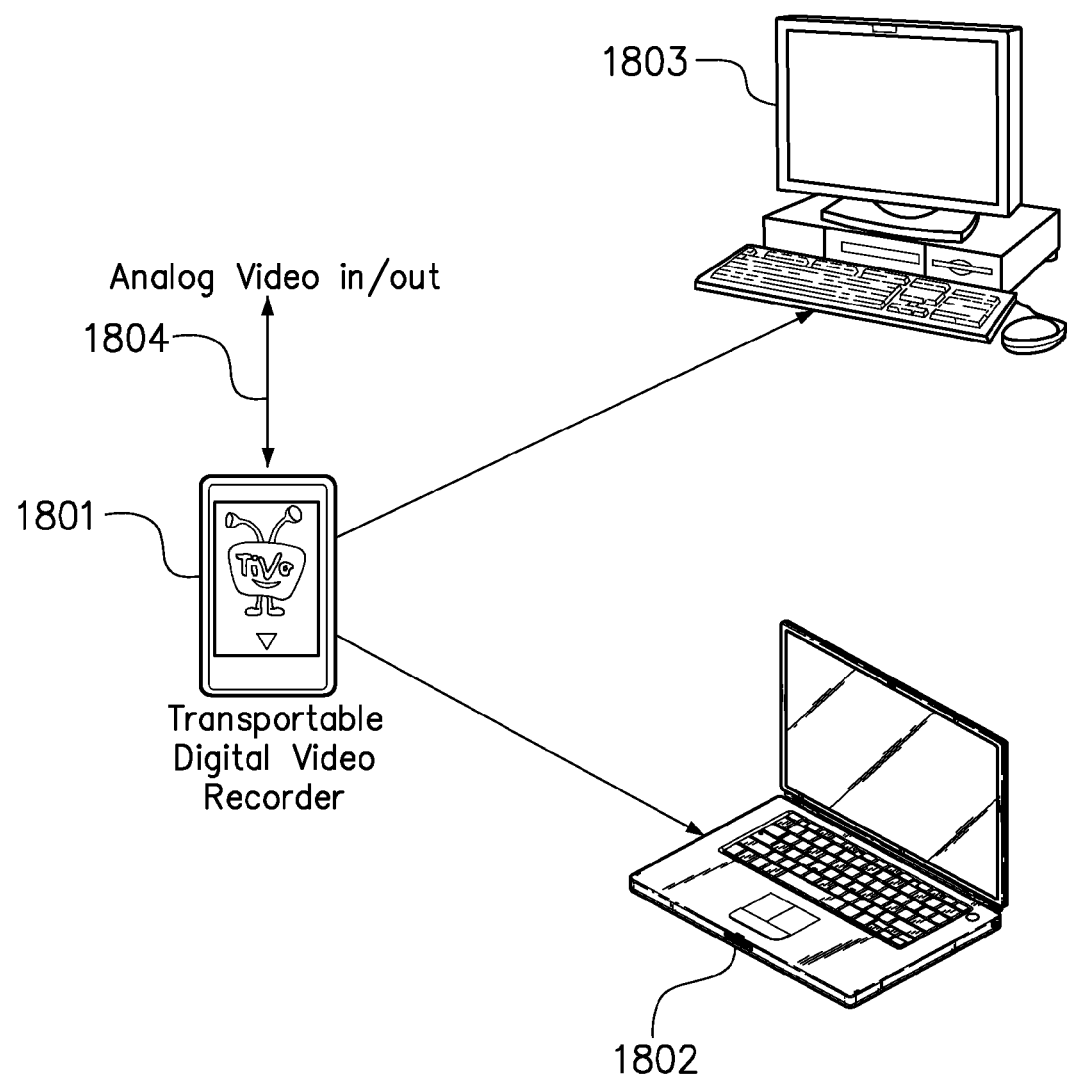
FIG. 18 is a block schematic diagram of a small form factor transportable digital video recorder embodiment of the invention interfacing with PCs according to the invention.

With respect to FIG. 17, a small form factor transportable digital video recorder 1702 containing either form described above can be inserted into a dock 1701. The dock 1701 and small form factor transportable digital video recorder 1702 authenticate each other using each other's public key and serial number. The dock downloads audio/video onto the small form factor transportable digital video recorder's microdrive. The user can then insert the small form factor transportable digital video recorder into a handheld device 1703. Since the small form factor transportable digital video recorder 1702 has the invention's MediaSwitch onboard, the handheld device 1703 accepts the digital streams for display from the small form factor transportable digital video recorder 1702. The user sends selection and control commands through the handheld 1703 to the small form factor transportable digital video recorder 1702. The user can use the trick-play features of the MediaSwitch on the audio/video material from the small form factor transportable digital video recorder's microdrive to listen to and view the material. The Small Form Factor Transportable Digital Video Recorder and the PC Referring to FIG. 18, the invention's small form factor transportable digital video recorder 1801 is easily interfaced to a typical PC, such as a laptop computer 1802 or desktop computer 1803 with PCMCIA ports. Typical PCs of this era have the capability in software to perform encoding and decoding functions. An outboard analog video input 1804 can be added to the small form factor transportable digital video recorder 1801 (for example, with a dongle of some kind, similar to those found on PCMCIA ethernet cards or with a doublewide card; or a TV antenna similar to the RF antennas on Richochet or other wide-area-wireless cards).

The small form factor transportable digital video recorder 1801 can digitize the analog signal and encode it, or pass it to the PC software for encoding, whence it is passed back to the small form factor transportable digital video recorder 1801 for storage. On output, the digital signal is passed from the small form factor transportable digital video recorder 1801 to the PC 1802, 1803 for decoding and display.

Another preferred embodiment of the invention modifies the analog video input to accept digital video and broadcast signals. At least one tuner, as described above, can also be onboard the small form factor transportable digital video recorder 1801. The tuner can tune to specific channels within the analog signal if the analog signal is a broadcast signal or the digital broadcast signal. Digital video signals are translated as described above and stored through the MediaSwitch.

Another preferred embodiment of the invention is an all-analog small form factor transportable digital video recorder 1801, in which the dongle 1804 provides analog out as well. The analog output from the dongle 1804 is connected to the PC's video input for display on its monitor. This provides complete content security, at least for the purely digital parts.

Otherwise, if the PC contains an embedded security system of some kind, an authentication phase can be entered that ensures that the software handling the video and audio media is untampered with (ala the Windows XP mechanisms) before permitting operation.

Backing up the Small Form Factor Transportable Digital Video Recorder

Figure 19:
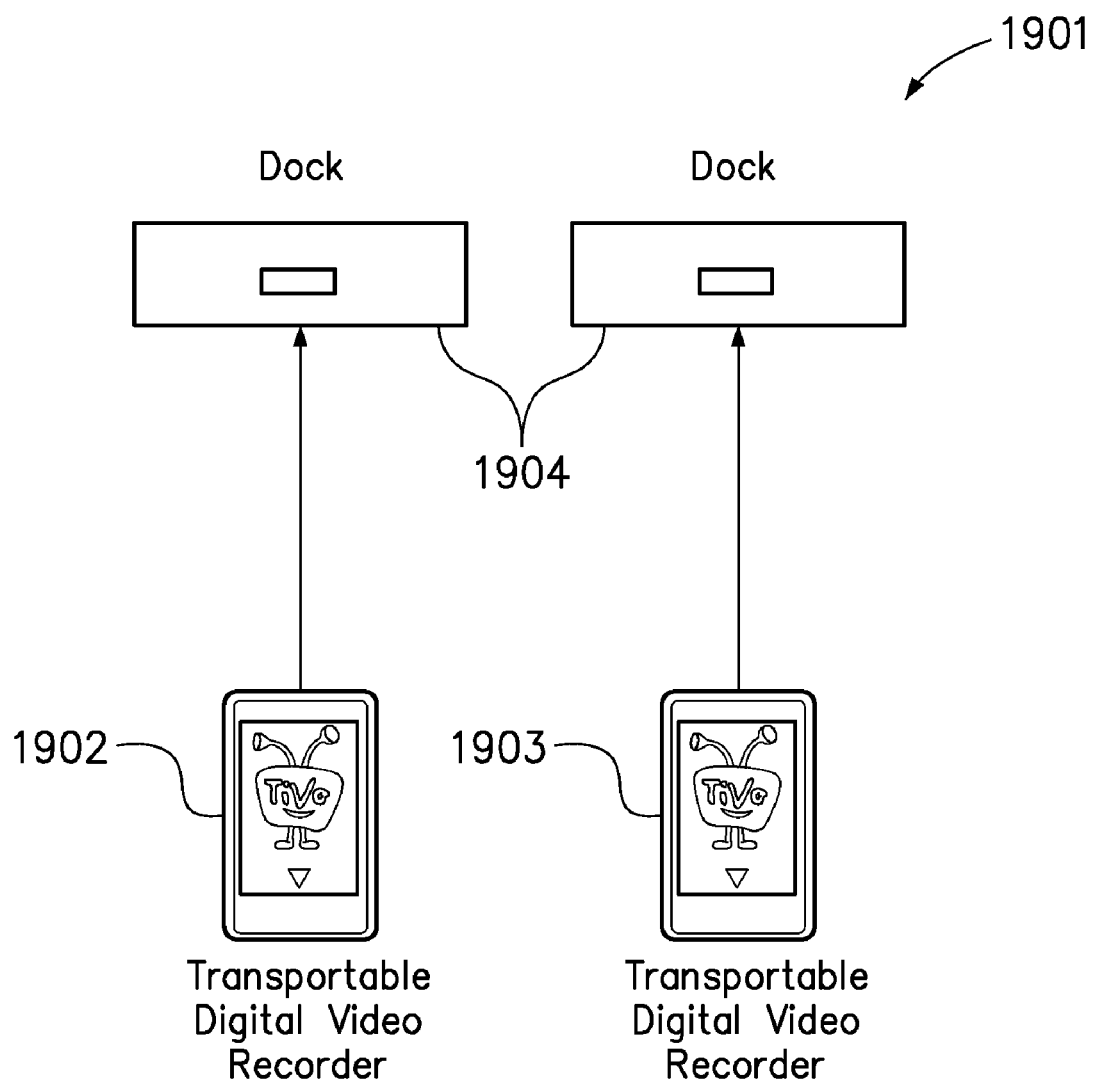
FIG. 19 is a block schematic diagram of a preferred embodiment of the invention that uses a docking station to transfer and backup data between small form factor transportable digital video recorder embodiments of the invention according to the invention.

With respect to FIG. 19, a dock 1901 with two (or more) slots 1904 can be used to transfer information between or backup the invention's small form factor transportable digital video recorders. The dock 1901 basically provides a backplane between the slots 1904. Stick two small form factor transportable digital video recorders 1902, 1903 in and they authenticate to each other. The user presses a button (real or virtual) and the content is copied from one small form factor transportable digital video recorder to the other. Even further, the user can selectively choose content to be copied from one card to the other.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for a small form factor transportable digital video recorder (DVR), comprising:
storing a plurality of digital streams on a storage device in a small form factor transportable DVR, the small form factor transportable DVR is inserted into a receiving device, thereby forming a communications link between the small form factor transportable DVR and the receiving device, a processor in the small form factor transportable DVR communicates with the receiving device via the communications link;
upon insertion of the small form factor transportable DVR into the receiving device, the small form factor transportable DVR authenticating the receiving device;
receiving, by the small form factor transportable DVR, a selection, from the receiving device, of a specific digital stream among the plurality of digital streams stored on the storage device in the small form factor transportable DVR;
selecting, by the small form factor transportable DVR, the specific digital stream from the storage device among the plurality of digital streams stored on the storage device;
outputting, by a decoder in the small form factor transportable DVR, display signals representing the specific digital stream to the receiving device.

2. The method of claim 1, further comprising:
receiving analog signals from the receiving device;
converting, by the small form factor transportable DVR, the analog signals into a digital stream; and
storing the digital stream on the storage device in the small form factor transportable DVR.

3. The method of claim 1, further comprising:
receiving digital video signals from the receiving device;
converting, by the small form factor transportable DVR, the digital video signals into a digital stream; and
storing said digital stream on the storage device in the small form factor transportable DVR.

4. The method of claim 1, further comprising:
accepting analog and/or digital television broadcast signals using a plurality of input signal tuners in the small form factor transportable DVR;
wherein each of said tuners is individually tuned to a specific broadcast signal;
converting analog television broadcast signals into a digital signal when an input signal tuner is configured to accept analog television broadcast signals;
converting digital signals or digital television broadcast signals into a digital stream when an input signal tuner is configured to accept digital television broadcast signals; and
storing the digital stream on the persistent storage device in the small form factor transportable DVR.

5. The method of claim 1, wherein the small form factor transportable DVR will only allow access to digital streams on the persistent storage device by an authorized receiving device.

6. The method of claim 1, further comprising:
storing an electronic program guide on the persistent storage device in the small form factor transportable DVR; and
wherein the small form factor transportable DVR delivers portions of the electronic program guide to the receiving device upon request from the receiving device.

7. The method of claim 1,
wherein a docking station comprises a plurality of small form factor transportable DVR slots;
wherein a first small form factor transportable DVR and a second transportable DVR are inserted into the small form factor transportable DVR slots; and
wherein the docking station allows a user to transfer data from the first small form factor transportable DVR to the second small form factor transportable DVR.

8. The method of claim 7, wherein the first small form factor transportable DVR and the second small form factor transportable DVR authenticate each other, and wherein when the first small form factor transportable DVR and the second small form factor transportable DVR validly authenticate each other, the first small form factor transportable DVR and the second small form factor transportable DVR allow the data transfer to occur.

9. The method of claim 7, wherein the docking station allows a user to select specific data on the first small form factor transportable DVR to transfer to the second small form factor transportable DVR.

10. The method of claim 1,
wherein a docking station comprises at least one small form factor transportable DVR slot;
wherein a small form factor transportable DVR is inserted into a small form factor transportable DVR slot among the at least one small form factor transportable DVR slot; and
wherein said docking station allows a user to transfer data via the docking station to the small form factor transportable DVR.

11. The method of claim 1, further comprising:
accepting control commands from a user via the receiving device.

12. The method of claim 11, wherein the user controls a delivery rate and direction of the outputting step to perform any of: variable rate fast forward, variable rate rewind, frame step, index, pause, variable rate reverse play, variable rate play, and play functions on said specific digital stream.

13. The method of claim 1, wherein the storage device is at least one microdrive.

14. The method of claim 1, wherein the storage device is at least one solid state memory device.

15. The method of claim 1, wherein the small form factor transportable DVR is a plug-in module.

16. An apparatus for a small form factor transportable digital video recorder (DVR), comprising:
a storage device in a small form factor transportable DVR;
a processor on the small form factor transportable DVR, the small form factor transportable DVR is inserted into a receiving device, thereby forming a communications link between the small form factor transportable DVR and the receiving device, the processor in the small form factor transportable DVR communicates with the receiving device via the communications link;
an authentication device in the small form factor transportable DVR that, upon insertion of the small form factor transportable DVR into the receiving device, authenticates the receiving device;
a plurality of digital streams stored on the storage device;
a command receiving subsystem in the small form factor transportable DVR that receives a selection from the receiving device of a specific digital stream among the plurality of digital streams stored on the storage device in the small form factor transportable DVR;
a digital stream selection device in the small form factor transportable DVR that selects the specific digital stream from the storage device among the plurality of digital streams stored on the storage device;
a decoder in the small form factor transportable DVR that outputs display signals representing the specific digital stream to the receiving device.

17. The apparatus of claim 16, further comprising:
an analog signal receiver that receives analog signals from the receiving device;
an analog signal to digital signal converter that converts the analog signals into a digital stream; and
a module for storing the digital stream on the storage device in the small form factor transportable DVR.

18. The apparatus of claim 16, further comprising:
a digital signal receiver that receives digital video signals from the receiving device;
a digital signal converter that converts the digital video signals into a digital stream; and
a module for storing said digital stream on the storage device in the small form factor transportable DVR.

19. The apparatus of claim 16, further comprising:
a plurality of input signal tuners on said small form factor transportable DVR;
wherein said plurality of tuners accept analog and/or digital television broadcast signals;
wherein each of said tuners is individually tuned to a specific broadcast signal;
an analog television broadcast signal to digital signal converter that converts analog television broadcast signals into a digital signal when an input signal tuner is configured to accept analog television broadcast signals;
a digital signal converter that converts digital signals or digital television broadcast signals into a digital stream when an input signal tuner is configured to accept digital television broadcast signals; and
a module for storing the digital stream on the persistent storage device in the small form factor transportable DVR.

20. The apparatus of claim 16, wherein the small form factor transportable DVR will only allow access to digital streams on the persistent storage device by an authorized receiving device.

21. The apparatus of claim 16, further comprising:
an electronic program guide on said persistent storage device; and
wherein the small form factor transportable DVR delivers portions of the electronic program guide to the receiving device upon request from the receiving device.

22. The apparatus of claim 16, further comprising:
a docking station;
wherein said docking station comprises a plurality of small form factor transportable DVR slots;
wherein a first small form factor transportable DVR and a second transportable DVR are inserted into the small form factor transportable DVR slots; and
wherein the docking station allows a user to transfer data from the first small form factor transportable DVR to the second small form factor transportable DVR.

23. The apparatus of claim 22, wherein the first small form factor transportable DVR and the second small form factor transportable DVR authenticate each other, and wherein when the first small form factor transportable DVR and the second small form factor transportable DVR validly authenticate each other, the first small form factor transportable DVR and the second small form factor transportable DVR allow the data transfer to occur.

24. The apparatus of claim 22, wherein the docking station allows a user to select specific data on the first small form factor transportable DVR to transfer to the second small form factor transportable DVR.

25. The apparatus of claim 16, further comprising:
a docking station;
wherein said docking station comprises at least one small form factor transportable DVR slot;
wherein a small form factor transportable DVR is inserted into a small form factor transportable DVR slot among the at least one small form factor transportable DVR slot; and
wherein said docking station allows a user to transfer data via the docking station to the small form factor transportable DVR.

26. The apparatus of claim 16, further comprising:
a module for accepting control commands from a user via the receiving device.

27. The apparatus of claim 26, wherein the user controls a delivery rate and direction of the decoder to perform any of: variable rate fast forward and rewind, frame step, index, pause, variable rate reverse play, variable rate play, and play functions on said specific digital stream.

28. The apparatus of claim 16, wherein the storage device is at least one microdrive.

29. The apparatus of claim 16, wherein the storage device is at least one solid state memory device.

30. The apparatus of claim 16, wherein the small form factor transportable DVR is a plug-in module.

31. A method for a small form factor transportable digital video recorder (DVR), comprising:
storing a plurality of digital streams on a storage device in a small form factor transportable DVR, the small form factor transportable DVR is communicatively connected to a receiving device, a processor in the small form factor transportable DVR communicates with the receiving device;
upon the small form factor transportable DVR being communicatively connected to the receiving device, the small form factor transportable DVR authenticating the receiving device;
receiving, by the small form factor transportable DVR, a selection, from the receiving device, of a specific digital stream among the plurality of digital streams stored on the storage device in the small form factor transportable DVR;
selecting, by the small form factor transportable DVR, the specific digital stream from the storage device among the plurality of digital streams stored on the storage device;
outputting, by a decoder in the small form factor transportable DVR, display signals representing the specific digital stream to the receiving device.

32. The method of claim 31, further comprising:
receiving analog signals from the receiving device;
converting, by the small form factor transportable DVR, the analog signals into a digital stream; and
storing the digital stream on the storage device in the small form factor transportable DVR.

33. The method of claim 31, further comprising:
receiving digital video signals from the receiving device;
converting, by the small form factor transportable DVR, the digital video signals into a digital stream; and
storing said digital stream on the storage device in the small form factor transportable DVR.

34. The method of claim 31, further comprising:
accepting analog and/or digital television broadcast signals using a plurality of input signal tuners in the small form factor transportable DVR;
wherein each of said tuners is individually tuned to a specific broadcast signal;
converting analog television broadcast signals into a digital signal when an input signal tuner is configured to accept analog television broadcast signals;
converting digital signals or digital television broadcast signals into a digital stream when an input signal tuner is configured to accept digital television broadcast signals; and
storing the digital stream on the persistent storage device in the small form factor transportable DVR.

35. The method of claim 31, wherein the small form factor transportable DVR will only allow access to digital streams on the persistent storage device by an authorized receiving device.

36. The method of claim 31, further comprising:
providing an electronic program guide on the persistent storage device in the small form factor transportable DVR; and
wherein the small form factor transportable DVR-delivers portions of the electronic program guide to the receiving device upon request from the receiving device.

37. The method of claim 31, further comprising
wherein a docking station comprises a plurality of small form factor transportable DVR slots;
wherein a first small form factor transportable DVR and a second transportable DVR are inserted into the small form factor transportable DVR slots; and
wherein the docking station allows a user to transfer data from the first small form factor transportable DVR to the second small form factor transportable DVR.

38. The method of claim 37, wherein the first small form factor transportable DVR and the second small form factor transportable DVR authenticate each other, and wherein when the first small form factor transportable DVR and the second small form factor transportable DVR validly authenticate each other, the first small form factor transportable DVR and the second small form factor transportable DVR allow the data transfer to occur.

39. The method of claim 37, wherein the docking station allows a user to select specific data on the first small form factor transportable DVR to transfer to the second small form factor transportable DVR.

40. The method of claim 31, further comprising
wherein a docking station comprises at least one small form factor transportable DVR slot;
wherein a small form factor transportable DVR is inserted into a small form factor transportable DVR slot among the at least one small form factor transportable DVR slot; and
wherein said docking station allows a user to transfer data via the docking station to the small form factor transportable DVR.

41. The method of claim 31, further comprising:
accepting control commands from a user via the receiving device.

42. The method of claim 41, wherein the user controls a delivery rate and direction of the outputting step to perform any of: variable rate fast forward, variable rate rewind, frame step, index, pause, variable rate reverse play, variable rate play, and play functions on said specific digital stream.

43. The method of claim 31, wherein said the small form factor transportable DVR is communicatively connected to the receiving device via any of: USB or Firewire.

44. The method of claim 31, wherein the storage device is at least one microdrive.

45. The method of claim 31, wherein the storage device is at least one solid state memory device.

46. The method of claim 31, wherein the small form factor transportable DVR is a plug-in module.

47. An apparatus for a small form factor transportable digital video recorder (DVR), comprising:
  a storage device in a small form factor transportable DVR;
  a processor on the small form factor transportable DVR, the small form factor transportable DVR is communicatively connected to a receiving device, the processor in the small form factor transportable DVR communicates with the receiving device;
  an authentication device in the small form factor transportable DVR that, upon the small form factor transportable DVR being communicatively connected to the receiving device, authenticates the receiving device;
  a plurality of digital streams stored on the storage device;
  a command receiving subsystem in the small form factor transportable DVR that receives a selection from the receiving device of a specific digital stream among the plurality of digital streams stored on the storage device in the small form factor transportable DVR;
  a digital stream selection device in the small form factor transportable DVR that selects the specific digital stream from the storage device among the plurality of digital streams stored on the storage device;
  a decoder in the small form factor transportable DVR that outputs display signals representing the specific digital stream to the receiving device.

48. The apparatus of claim 47, further comprising:
  an analog signal receiver that receives analog signals from the receiving device;
  an analog signal to digital signal converter that converts the analog signals into a digital stream; and
  a module for storing the digital stream on the storage device in the small form factor transportable DVR.

49. The apparatus of claim 47, further comprising:
  a digital signal receiver that receives digital video signals from the receiving device;
  a digital signal converter that converts the digital video signals into a digital stream; and
  a module for storing said digital stream on the storage device in the small form factor transportable DVR.

50. The apparatus of claim 47, further comprising:
  a plurality of input signal tuners on said small form factor transportable DVR;
  wherein said plurality of tuners accept analog and/or digital television broadcast signals;
  wherein each of said tuners is individually tuned to a specific broadcast signal;
  an analog television broadcast signal to digital signal converter that converts analog television broadcast signals into a digital signal when an input signal tuner is configured to accept analog television broadcast signals;
  a digital signal converter that converts digital signals or digital television broadcast signals into a digital stream when an input signal tuner is configured to accept digital television broadcast signals; and
  a module for storing the digital stream on the persistent storage device in the small form factor transportable DVR.

51. The apparatus of claim 47, wherein the small form factor transportable DVR will only allow access to digital streams on the persistent storage device by an authorized receiving device.

52. The apparatus of claim 47, further comprising:
  an electronic program guide on said persistent storage device; and
  wherein the small form factor transportable DVR-delivers portions of the electronic program guide to the receiving device upon request from the receiving device.

53. The apparatus of claim 47, further comprising:
  a docking station;
  wherein said docking station comprises a plurality of small form factor transportable DVR slots;
  wherein a first small form factor transportable DVR and a second transportable DVR are inserted into the small form factor transportable DVR slots; and
  wherein the docking station allows a user to transfer data from the first small form factor transportable DVR to the second small form factor transportable DVR.

54. The apparatus of claim 53, wherein the first small form factor transportable DVR and the second small form factor transportable DVR authenticate each other, and wherein when the first small form factor transportable DVR and the second small form factor transportable DVR validly authenticate each other, the first small form factor transportable DVR and the second small form factor transportable DVR allow the data transfer to occur.

55. The apparatus of claim 53, wherein the docking station allows a user to select specific data on the first small form factor transportable DVR to transfer to the second small form factor transportable DVR.

56. The apparatus of claim 47, further comprising:
  a docking station;
  wherein said docking station comprises at least one small form factor transportable DVR slot;
  wherein a small form factor transportable DVR is inserted into a small form factor transportable DVR slot among the at least one small form factor transportable DVR slot; and
  wherein said docking station allows a user to transfer data via the docking station to the small form factor transportable DVR.

57. The apparatus of claim 47, further comprising:
  a module for accepting control commands from a user via the receiving device.

58. The apparatus of claim 57, wherein the user controls a delivery rate and direction of the decoder to perform any of: variable rate fast forward and rewind, frame step, index, pause, variable rate reverse play, variable rate play, and play functions on said specific digital stream.

59. The apparatus of claim 47, wherein said the small form factor transportable DVR is communicatively connected to the receiving device via any of: USB or Firewire.

60. The apparatus of claim 47, wherein the storage device is at least one microdrive.

61. The apparatus of claim 47, wherein the storage device is at least one solid state memory device.

62. The apparatus of claim 47, wherein the small form factor transportable DVR is a plug-in module.

* * * * *